(12) United States Patent
Wang et al.

(10) Patent No.: US 11,998,912 B2
(45) Date of Patent: Jun. 4, 2024

(54) TUBING-FREE, SAMPLE-TO-DROPLET MICROFLUIDIC SYSTEM AND CHIP

(71) Applicant: The Johns Hopkins University, Baltimore, MD (US)

(72) Inventors: Tza-Huei Jeff Wang, Germantown, MD (US); Kuangwen Hsieh, Baltimore, MD (US); Yi-Fan Frank Hsieh, New Taipei (TW); Aniruddha Mrithinjay Kaushik, Baltimore, MD (US); Fangchi Shao, Baltimore, MD (US); Pengfei Zhang, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/954,000

(22) Filed: Sep. 27, 2022

(65) Prior Publication Data
US 2023/0110440 A1 Apr. 13, 2023

Related U.S. Application Data

(60) Provisional application No. 63/248,797, filed on Sep. 27, 2021.

(51) Int. Cl.
*B01L 3/00* (2006.01)
*B25J 9/16* (2006.01)

(52) U.S. Cl.
CPC ....... *B01L 3/502738* (2013.01); *B25J 9/1697* (2013.01); *B01L 2300/0636* (2013.01);
(Continued)

(58) Field of Classification Search
CPC ....... B01L 2400/049; B01L 2300/0636; B01L 2300/0883; B01L 2300/0816; B01L 3/502784
See application file for complete search history.

(56) References Cited

U.S. PATENT DOCUMENTS

2011/0103176 A1* 5/2011 Van Dam ............ B01F 35/8822
366/154.1

OTHER PUBLICATIONS

Kim et al., "Microfluidic Automation Using Elastomeric Valves and Droplets: Reducing Reliance on External Controllers," Small, vol. 8, No. 19, pp. 2925-2934. (Year: 2012).*
(Continued)

*Primary Examiner* — Young J Kim
(74) *Attorney, Agent, or Firm* — Venable LLP; Henry J. Daley

(57) ABSTRACT

A tubing-free, sample-to-droplet microfluidic system includes a tubing-free, sample-to-droplet microfluidic chip; a valve control system connected to the tubing-free, sample-to-droplet microfluidic chip; a vacuum system fluidly connected to the tubing-free, sample-to-droplet microfluidic chip; and a droplet formation pressure system fluidly connected to the tubing-free, sample-to-droplet microfluidic chip. A microfluidic chip for a tubing-free, sample-to-droplet microfluidic system includes a tubing-free, sample-to-droplet interface section; a droplet mixing section in fluid connection with the tubing-free, sample-to-droplet interface section to received droplets therefrom; an incubation section in fluid connection with the droplet mixing section to receive droplets therefrom; and a detection section in fluid connection with the incubation section to receive droplets therefrom.

10 Claims, 14 Drawing Sheets

(52) U.S. Cl.
CPC ... *B01L 2300/0883* (2013.01); *B01L 2400/02* (2013.01); *B01L 2400/049* (2013.01); *B01L 2400/0666* (2013.01)

(56) References Cited

OTHER PUBLICATIONS

Zhang et al., "Customizing droplet contents and dynamic ranges via integrated programmable picodroplet assembler," Microsystems & Nanoengineering, vol. 5, pp. 1-12. (Year: 2019).*
Xu et al., "Vacuum-driven power-free microfluidics utilizing the gas solubility or permeability of polydimethylsiloxane (PDMS)," Lab on a Chip, pp. 1-18. (Year: 2015).*
S.-Y Teh et al., Droplet Microfluidics, Lab on a Chip, 8(2008) 198-220.
S. Mashaghi et al., Droplet microfluidics: A tool for biology, chemistry and nanotechnology, TrAC Trends in Analytical Chemistry, 82(2016) 118-25.
A.M., Nightingale et al., Controlled multistep synthesis in a three-phase droplet reactor, Nature communications, 5(2014) 1-8.
E. Garcia-Egido et al., Synthesis and analysis of combinatorial libraries performed in an automated micro reactor system, Lab on a Chip, 3(2003) 73-6.
R. Obexer et al., Emergence of a catalytic tetrad during evolution of a highly active artificial aldolase, Nature chemistry, 9(2017) 50-6.
F. Ma et al., Efficient molecular evolution to generate enantioselective enzymes using a dual-channel microfluidic droplet screening platform, Nature communications, 9(2018) 1-8.
F. Eduati et al., A microfluidics platform for combinatorial drug screening on cancer biopsies, Nature communications, 9(2018) 1-13.
R. Abdelaziz et al., Green chemistry and nanofabrication in a levitated Leidenfrost drop, Nature communications, 4(2013) 1-10.
Leng, J.-B. Salmon, Microfluidic crystallization, Lab on a Chip, 9(2009) 24-34.
K.V. Kaler et al., Droplet microfluidics for chip-based diagnostics, Sensors, 14(2014) 23283-306.
D.-K. Kang et al., Droplet microfluidics for single-molecule and single-cell analysis in cancer research, diagnosis and therapy, TrAC Trends in Analytical Chemistry, 58(2014) 145-53.
M.T. Guo et al., Droplet microfluidics for high-throughput biological assays, Lab on a Chip, 12(2012) 2146-55.
J.M. Ramsey, The burgeoning power of the shrinking laboratory, Nature Biotechnology, 17(1999) 1061-2.
T. Tran et al., From tubes to drops: droplet-based microfluidics for ultrahigh-throughput biology, Journal of Physics D: Applied Physics, 46(2013) 114004.
E.S. Hamilton et al., Direct macro-to-micro interface method for microfluidics, Journal of Micromechanics and Microengineering, 30(2020) 057001.
T.D. Rane, et al., A serial sample loading system: interfacing multiwell plates with microfluidic devices, J Lab Autom, 17(2012) 370-7.
R. Menezes et al., Streamlined digital bioassays with a 3D printed sample changer, Analyst, 145(2020) 572-81.
O.J. Miller et al., High-resolution dose-response screening using droplet-based microfluidics, Proceedings of the National Academy of Sciences, 109(2012) 378-83.

U. Tangen et al., DNA-library assembly programmed by on-demand nano-liter droplets from a custom microfluidic chip, Biomicrofluidics, 9(2015) 044103.
T.S. Kaminski et al., Automated generation of libraries of nL droplets, Lab on a Chip, 12(2012) 3995-4002.
J. Clausell-Tormos, An automated two-phase microfluidic system for kinetic analyses and the screening of compound libraries, Lab on a Chip, 10(2010) 1302-7.
D.L. Chen et al., Microfluidic cartridges preloaded with nanoliter plugs of reagents: an alternative to 96-well plates for screening, Current opinion in chemical biology, 10(2006) 226-31.
M. Chabert et al., Automated microdroplet platform for sample manipulation and polymerase chain reaction, Analytical Chemistry, 78(2006) 7722-8.
Y. Sun et al., A novel picoliter droplet array for parallel real-time polymerase chain reaction based on double-inkjet printing, Lab Chip, 14(2014) 3603-10.
V. Studer et al., Scaling properties of a low-actuation pressure microfluidic valve, Journal of applied physics, 95(2004) 393-8.
H.C. Zec et al., Programmable microfluidic genotyping of plant DNA samples for marker-assisted selection, Microsystems & Nanoengineering, 4(2018) 1-10.
T.D. Rane et al., A barcode-free combinatorial screening platform for matrix metalloproteinase screening, Anal Chem, 87(2015) 1950-6.
H. Zec et al., Microfluidic platform for on-demand generation of spatially indexed combinatorial droplets, Lab on a Chip, 12(2012) 3055-62.
G. Gome et al., OpenLH: Open Liquid-Handling System for Creative Experimentation with Biology, Proceedings of the Thirteenth International Conference on Tangible, Embedded, and Embodied Interaction, Association for Computing Machinery, Tempe, Arizona, USA, 2019, pp. 55-64.
S. Steffens et al., A versatile and low-cost open source pipetting robot for automation of toxicological and ecotoxicological bioassays, PLoS One, 12(2017) e0179636.
P. Zhu et al., Passive and active droplet generation with microfluidics: a review, Lab on a Chip, 17(2017) 34-75.
P. Zhang et al., Customizing droplet contents and dynamic ranges via integrated programmable picodroplet assembler, Microsyst Nanoeng, 5(2019) 22.
O.V. Trubetskoy et al., Highly miniaturized formats for in vitro drug metabolism assays using Vivid® fluorescent substrates and recombinant human cytochrome P450 enzymes, Journal of biomolecular screening, 10(2005) 56-66.
M. Vaithiyanathan et al., Luminescent nanomaterials for droplet tracking in a microfluidic trapping array, Analytical and bioanalytical chemistry, 411(2019) 157-70.
H. Li et al., A Multiwell Microfluidic Device for Analyzing and Screening Nonhormonal Contraceptive Agents, Small, 15(2019) e1901910.
R.M. Imamura et al., Inexpensive High-Throughput Screening of Kinase Inhibitors Using One-Step Enzyme-Coupled Fluorescence Assay for ADP Detection, SLAS Discovery: Advancing Life Sciences R&D, 24(2019) 284-94.
J. Hashimoto et al., Novel in vitro protein fragment complementation assay applicable to high-throughput screening in a 1536-well format, Journal of biomolecular screening, 14(2009) 970-9.

* cited by examiner

TUBING-FREE, SAMPLE-TO-DROPLET MICROFLUIDIC SYSTEM AND CHIP

CROSS-REFERENCE OF RELATED APPLICATION

This application claims priority to U.S. Provisional Application No. 63/248,797 filed Sep. 27, 2021; the entire content of which is hereby incorporated by reference.

STATEMENT OF GOVERNMENT SUPPORT

This invention was made with government support under grant AI117032 awarded by the National Institutes of Health. The government has certain rights in the invention.

BACKGROUND

1. Technical Field

Currently claimed embodiments of the invention relate to a tubing-free, sample-to-droplet microfluidic system and a tubing-free, sample-to-droplet chips and methods.

2. Discussion of Related Art

Limitations of traditional tubing-based sample-to-device interfaces which include their large dead volumes, poor scalability, long idle times, and low throughput have precluded microfluidics technologies from achieving effective high-throughput screening. In most microfluidics systems, including droplet platforms, samples must be preloaded into syringes or tubing to facilitate infusion into microfluidic devices via syringe pumps or other pressure sources. Though the microfluidic device itself may analyze micro- or even nanoliters of sample, such tubing-based infusion requires orders of magnitude greater volumes of samples to be loaded within the input tubing or syringe. This mismatch in volume between the tubing and device can lead to large amounts of unused "dead" volumes within the loading interface and thus significant sample waste. Moreover, it is difficult and impractical to introduce a large number of sample-containing tubes to a miniature microfluidic device via distinct inlets, limiting the overall scalability of such a system. As a result, such a tubing-based interface necessitates the preparation of a new sample-containing tubing for every additional sample tested, adding unwanted idle time and making sample switching labor-intensive and time-consuming. This ultimately limits droplet platforms from achieving large-scale sample processing in a fully automated manner and thereby limits the throughput of sample screening, hindering their utility for HTS applications.

Previous devices have sought to address the scalability restriction of traditional tubing-based interfaces by leveraging commercial and custom autosamplers. Typical autosamplers can enable the injection of different samples from multi-well plates into chips via a single tubing and enable the switching of different samples by moving the multi-well plate or tubing via a motorized stage, wherein each sample plugs is separated from each other by air or oil barriers. Though this could be an automated process, injecting and switching the samples using autosamplers incur long idle time and induce large dead volumes for reliable performance. Therefore, in order to fully unlock droplet microfluidics for HTS, a new "sample-to-droplet" interface needs to be designed to overcome the current limitations.

SUMMARY

A tubing-free, sample-to-droplet microfluidic system according to an embodiment of the current invention includes a tubing-free, sample-to-droplet microfluidic chip; a valve control system connected to the tubing-free, sample-to-droplet microfluidic chip; a vacuum system fluidly connected to the tubing-free, sample-to-droplet microfluidic chip; and a droplet formation pressure system fluidly connected to the tubing-free, sample-to-droplet microfluidic chip.

A microfluidic chip for a tubing-free, sample-to-droplet microfluidic system according to an embodiment of the current invention includes a tubing-free, sample-to-droplet interface section; a droplet mixing section in fluid connection with the tubing-free, sample-to-droplet interface section to received droplets therefrom; an incubation section in fluid connection with the droplet mixing section to receive droplets therefrom; and a detection section in fluid connection with the incubation section to receive droplets therefrom. The tubing-free, sample-to-droplet interface section includes a first sample input channel with an open port configured to receive a tubing-free sample input, a vacuum channel fluidly connected to the first sample input channel when a pair of intermediate valves therein are open, a first droplet forming region being between the pair of intermediate valves, a first fluid pressure channel arranged to intercept the first droplet forming region with a valve prior to the droplet forming region, the first fluid pressure channel further intercepting a droplet channel with a valve therebetween, the droplet channel leading to the droplet mixing section.

DETAILED DESCRIPTION

Figure 1A:
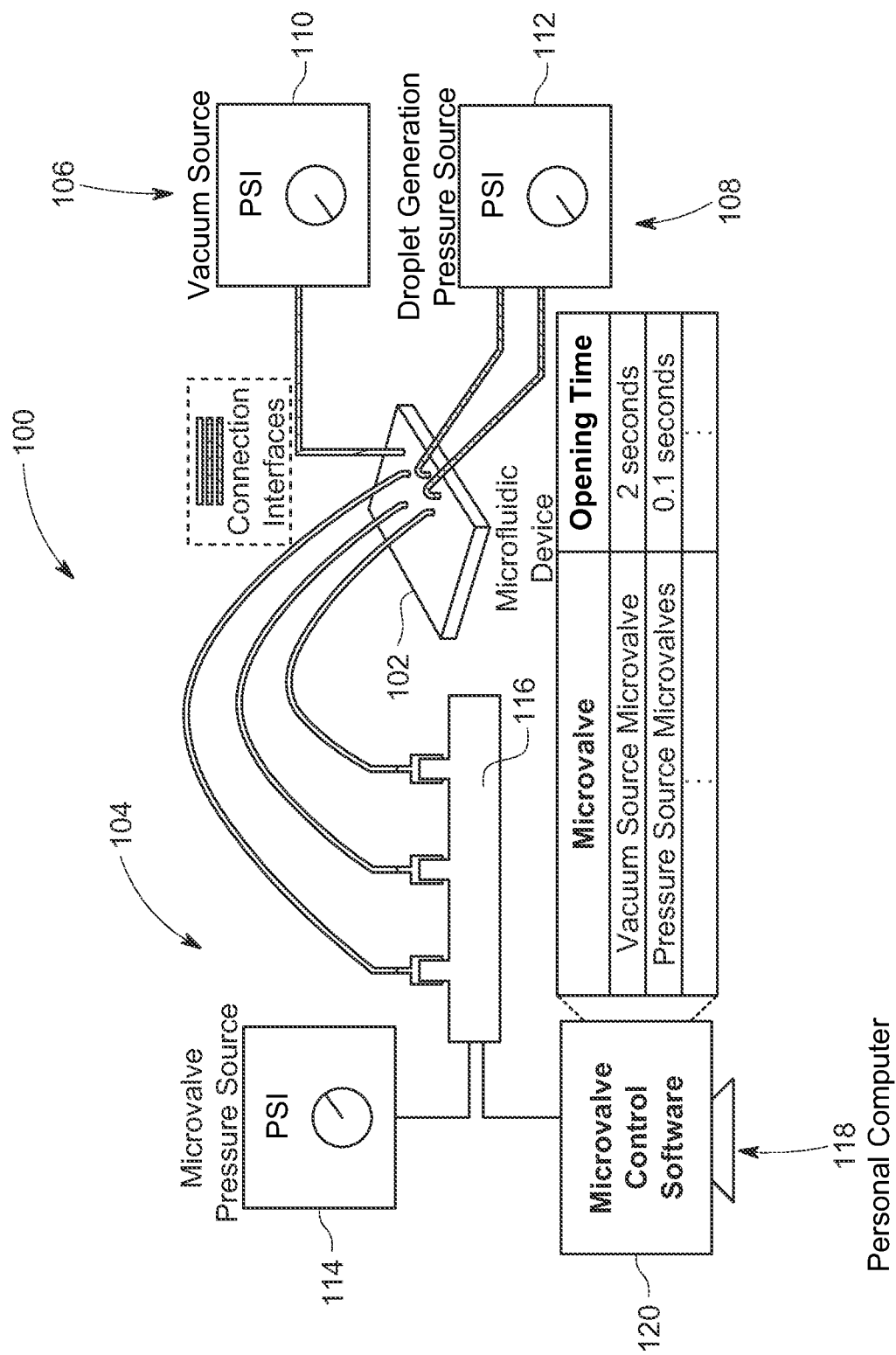
FIG. 1A is a schematic illustration of a tubing-free, sample-to-droplet microfluidic system according to an embodiment of the invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed, without departing from the broad concepts of the present invention. All references cited anywhere in this specification are incorporated by reference as if each had been individually incorporated.

Accordingly, an embodiment of the current invention is directed to a novel sample-to-droplet interface that obviates the use of tubing and allows for automated and parallelized sample loading into microfluidic devices. The sample loading interface according to some embodiments leverages both a vacuum source and a pressure source and is initiated by directly spotting a sample on a designated region/port of the microfluidic device without the use of tubing. With the sample spotted on the device port, programmable microfluidics valves are used to regulate vacuum-assisted infusion of the sample from the port into the device followed by pressure-driven generation of nanoliter droplets. Essentially the entire volume of spotted sample is infused into the device, leading to substantially zero dead volume. An embodiment of the current invention achieves high scalability as series of samples can be processed by the sample-to-droplet interface in succession, without user intervention. Furthermore, parallelization of two or more sample-to-droplet ports can minimize the idle time and further enhance throughput.

Some aspects of the current invention are directed to:

1) Tubing-free sample dispensing: In some embodiments, samples are directly dispensed onto designated inlet regions/ports of the microfluidic droplet device instead of being injected via tubing. This tubing-free feature can offer advantages, such as the following three:

Versatile integration with various sample dispensing strategies: Because samples are directly spotted onto the device without any tubing, some embodiments of this invention allow samples to be dispensed via different strategies for different purposes. For example, samples can be manually pipetted for initial testing or robotically dispensed via automated dispensing systems for HTS.

Minimal waste of samples: Tubing-free dispensing of samples onto the designated inlet regions/ports of the microfluidic droplet device minimizes the sample volumes required for reliable performance as there is no need to load an unnecessarily large volume of samples into tubing anymore, eliminating dead volume and associated sample waste.

Scalable operation without compromising device footprint: As many samples can be sequentially dispensed onto the device without tubing, the number of samples that can be processed is no longer limited by the number of inlets on a device and hence the device footprint. This new way of loading samples unlocks the potential of screening large number of samples and significantly enhances the scalability of the system.

2) Automated sample-to-droplet interface: Each spotted sample is infused into the microfluidic droplet device and discretized into droplets in an automated process without user intervention. The inlet regions/ports of the microfluidic droplet device are connected to a vacuum source and a pressure source, both are regulated on-chip by programmable microvalves. Automated infusion of the sample into the microfluidic droplet device is accomplished by programmatically opening the vacuum microvalve to draw the sample into the device and into a sample holding channel. Next the vacuum microvalve is closed and the pressure microvalve is opened to drive the sample into the nanodroplet assembly channel, wherein the sample can be co-encapsulated along with other reagents into customized nanodroplets, before being pushed downstream for incubation and detection. Moreover, this automated sample-to-droplet interface according to some embodiments facilitates four additional advantages:

Negligible dead volume from sample to droplet: Dead volumes, which arise from the mismatched volumes of the sample-to-droplet interface and miniaturized device, are eliminated by our new sample-to-droplet interface. The small dead volume can reduce the operation cost and minimize unnecessary sample consumptions.

Self-regulated constant sample volume: The total sample volume processed in a chip is regulated only by the dimensions of sample holding channels, ensuring all input samples processed by a device are indeed the same.

Facile sample switching including cleaning and drying: Introduction of a new sample triggers the cleaning and drying of the holding channel that was used for the previous sample. With many ways or methods to wash the channel, we discovered that using air to pre-rinse the channel before continuous water washing and air drying showed sufficient washing ability with the simplest operations.

Repeatable sample-to-droplet operation facilitates high scalability: With sufficient washing capability, the same sample holding channel or sample-to-chip unit can be applied.

repetitively to switch different samples. Without the needs for additional tubing and ports to load new samples, our sample-to-droplet interface can achieve high scalability without sacrificing the small footprint of the device.

3) Parallelization of the sample-to-droplet interface: Two or more sample-to-droplet ports can co-exist on the microfluidic device to further enhance the throughput of our system by enabling parallel operations. Traditional operation after the loading of the sample is to clean the channel with air or water to minimize the cross contamination, which can induce undesired waiting time. In contrast, with parallelized sample-to-droplet interface in our nanodroplet device, we can continuously load and generate droplets from one sample while cleaning the other sample loading channel. In this way, this platform can avoid the undesired waiting time and reduce the downtime of sample switching to further increase the throughput.

4) Fully-integrated platform with reagent assembly, on-chip incubation, and in-line detection: The current embodiment of our invention is realized within a novel, fully-integrated platform that also possesses reagent assembly, on-chip incubation, and in-line fluorescence detection capabilities. In this platform, samples are first discretized into droplets, mixed with user-defined and preloaded reagents, incubated within the device to perform reactions, and finally detected by a laser induced fluorescence (LIF) detector. Importantly, these steps take place autonomously as droplets flow in a continuous flow, thereby further ensuring automated operation without user intervention.

In an embodiment of this invention, sample loading can be achieved by manual pipetting. Other embodiments may use robotic sample handling systems to ensure fully automated operation that maximizes throughput and minimizes human errors.

In an embodiment of this invention, the samples can be directly "spotted" via pipetting on the microfluidic droplet device that is fabricated out of PDMS. This spotting technique may leave behind residues of samples on the surface of the device even after samples are loaded into the device.

Other embodiments of the device can be surface-treated with chemicals such as RainX to render the PDMS surface more hydrophobic, thereby reducing residues and cross-contamination.

In an embodiment of this invention, the microfluidics chip can be fabricated using polydimethylsiloxane (PDMS), where other materials can be considered as alternatives such as, but not limited to, poly-ethylene glycol diacrylate (PEGDA).

In an embodiment of this invention, droplet incubation can be performed on-chip. Though convenient, on-chip incubation nevertheless can limit the number of droplets that can be simultaneously incubated because the volume of the incubation channel is still relatively small. To fit the needs of large-scale screening, other embodiments may replace incubation channels with external "incubation tubing" (e.g., Teflon, PTFE, etc.) that is inserted into the device to ensure higher capability of incubation.

The biochemical assay for illustrating a current embodiment of our invention takes place at room temperature. Other embodiments may be coupled to various chemical and biochemical assays with different incubation temperatures, for which customized heaters that are attached to selected regions of the incubation tubing can be used.

In some embodiments the droplets can be periodically generated with some time in between each droplet to help divide them from merging. This restricts the frequency of generating the droplets and the throughput. Therefore, another droplet with different liquid properties can be generated in between the sample droplets to avoid the merging and increase the throughput.

In an embodiment of this invention, droplets can be generated by programmatically controlling the microvalves. In other embodiments, this tubing-free sample-to-droplet interface can be incorporated into other types of droplet devices such as T-junction droplet generator and V-junction droplet generator.

In an embodiment of this invention, the capability of the sample holding channel is around 700 nL. However, this capability can be simply changed to other desired volume by changing the dimensions of the holding channel for the appropriate applications.

In an embodiment of this invention, quake valves can be used to control the sample-to-droplet interface as well as the flow of the carrier oils. In other embodiments, other types of microvalve design could be integrated into the chip to prove the feasibility such as braille microvalve, plunger valves, and check valves.

An embodiment of a tubing-free, sample-to-droplet microfluidic system 100 is shown schematically in FIG. 1A. In particular, this embodiment includes at least a tubing-free, sample-to-droplet microfluidic chip 102; a valve control system 104 connected to the tubing-free, sample-to-droplet microfluidic chip 102; a vacuum system 106 fluidly connected to the tubing-free, sample-to-droplet microfluidic chip 102; and a droplet formation pressure system 108 fluidly connected to the tubing-free, sample-to-droplet microfluidic chip 102.

In FIG. 1A, the microfluidic device 100 can be or at least include the tubing-free, sample-to-droplet microfluidic chip 102, the vacuum system 106 includes at least the vacuum source 110, and the droplet formation pressure system includes at least the droplet pressure generation source 112. The values given for the opening times are examples and not intended to limit the scope of the invention.

In the example of FIG. 1A, the actuation and control of the microvalves in the microfluidic device 100 was achieved by a microvalve pressure source 114, microvalves 116, and a personal computer 118. The microvalve pressure source 114 was used to apply pressure to the microvalves 116, such that the pressure can fully close the microvalves 116 during the closed state. The microvalves 116 interface the microvalve pressure source 114 to the microfluidic device 100 and can be controlled to open/close the microvalves 116 on-demand. During the operation and at the initial state, all microvalves 116 are closed. The microvalve control software 120 on the personal computer 118 can be inputted with programed sequential instructions, including the specific microvalve to be opened and the opening time, to control the sample loading via the vacuum source 110 and the droplet generation via another pressure source 112.

Figure 1B:
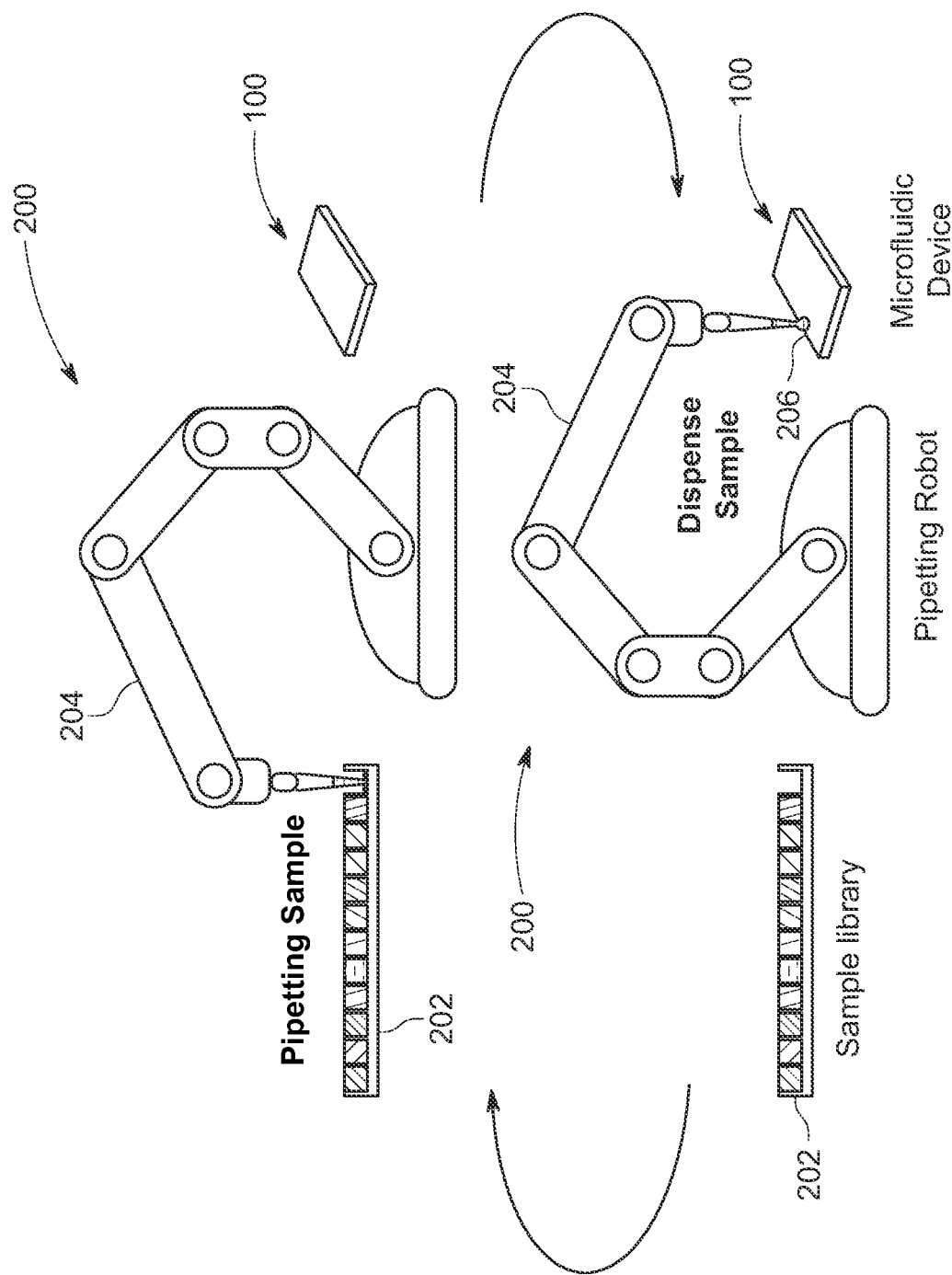
FIG. 1B is a schematic illustration of a robotic system integrated with the a tubing-free, sample-to-droplet microfluidic system according to an embodiment of the invention.

FIG. 1B is a schematic illustration to facilitate explanation of integration of a robotic system 200 with the system 100 of FIG. 1A for loading samples.

FIG. 1B is a schematic illustration of pipetting robot 200 to remove the manual pipetting procedures according to an embodiment of the current invention. The sample library 202 can be stored on an array or microtiter plates, where the robotic arm 204 can pipet each sample in and dispense them onto the microfluidic surface inlet port 206. The microvalve control system can control the vacuum to load the samples into the device for later droplet generation. Such procedure can be repeated for every new additional samples.

Another embodiment of the current invention is directed to a microfluidic chip 102 for a tubing-free, sample-to-droplet microfluidic system 100. The examples below show a particular embodiment of such a microfluidic chip. In the examples, the term "zone" can be viewed as synonymous to "section" for that example. The microfluidic chip according to some embodiments of the current invention includes at least a tubing-free, sample-to-droplet interface section; a droplet mixing section in fluid connection with the tubing-free, sample-to-droplet interface section to receive droplets therefrom; an incubation section in fluid connection with the droplet mixing section to receive droplets therefrom; and a detection section in fluid connection with the incubation section to receive droplets therefrom.

The tubing-free, sample-to-droplet interface section according to some embodiments includes a first sample input channel with an open port configured to receive a tubing-free sample input, a vacuum channel fluidly connected to the first sample input channel when a pair of intermediate valves therein are open, a first droplet forming region being between said pair of intermediate valves, a first fluid pressure channel arranged to intercept the first droplet forming region with a valve prior to the droplet forming region, the first fluid pressure channel further intercepting a droplet channel with a valve therebetween, the droplet channel leading to the droplet mixing section.

Some embodiments can include two or more structures similar to the above for forming droplets sequentially, at the same time, or both. The general concepts of the current invention are not limited to a particular number of tubing-free, sample-to-droplet forming structures. There can be one, two as shown in some examples, three, or more than three, without limitation to the concepts of the current invention.

Some embodiments of a tubing-free, sample-to-droplet microfluidic system according to the current invention can include a microfluidic chip according to an embodiment of the current invention. Some embodiments of the microfluidic chip may have only the sample-to-droplet interface section, or may include any one or more of the a droplet mixing section, the incubation section, and the a detection section. Other embodiments of the microfluidic chip may include other structures and/or sections on the chip without limitation to the general concepts of the current invention.

EXAMPLES

The following describes some particular examples according to some embodiments of the current invention. The general concepts of this invention are not limited to these particular examples.

Advancing droplet microfluidics for a wide range of chemical and biomedical applications [1, 2] such as chemical synthesis[3, 4], directed evolution[5, 6], high-throughput drug screening[7], green chemistry and nanoparticle fabrication[8], crystallization[9], diagnosis[10], and single-molecule and single-cell analysis[11] is a burgeoning research area. Indeed, by discretizing a bulk reaction into massively parallelized water-in-oil emulsion droplets that serve as nano- to picoliter scale reaction compartments, droplet microfluidics offers compelling advantages in detection sensitivity, assay time, reagent consumption, and cost[1, 12]. While droplet microfluidics excels at analyzing one sample (i.e., discretizing the sample with a reagent at a fixed concentration into identical droplets), analyzing multiple samples—a common practice in biomedical and pharmaceutical applications—require either multiple devices or a facile sample loading method. Currently, sample loading in droplet microfluidics predemoninantly use tubing-based interfaces[13-15]. That is, samples are injected through designated tubings and inlets into the droplet microfluidic device via a pressure source such as a syringe pump. Though practical, tubing-based sample loading faces drawbacks such as limited scalability for processing many samples, difficulty for automation, and sample wastage. Therefore, there remains a need for improving sample loading for droplet microfluidics.

In principle, there are two approaches for improving sample loading for droplet microfluidics. One approach is retaining tubing for loading samples into droplet microfluidic devices and improving external instrumentation. To this end, autosamplers are emerging solutions with promises of scalability and automation[16-24]. Autosamplers typically house multiple samples and leverage various sample switching mechanisms (e.g., motorized stage[16, 23, 24], rotational stage[17], high-performance liquid chromatography[18], injection loops[19]) to load multiple samples through a single tube to the droplet microfluidic device. The second approach, which is fundamentally opposite, is freeing droplet microfluidic devices from tubing while loading samples. Such a tubing-free sample loading method is appealing because it readily lifts tubing-related restrictions such as scalability. To date, however, as a tubing-free sample loading method has yet to be developed, the potential for this approach for improving sample loading for droplet microfluidics—including in scalability, sample wastage, automation, and idle time—remains unknown.

To fill this knowledge gap, we have developed a droplet microfluidic chip with a novel Tubing Eliminated Sample Loading Interface (TESLI) that frees our chip from the need of tubing for sample loading. Our TESLI uses a network of programmable microvalves to regulate a vacuum source for infusion and a pressure source for injection. In doing so, sub-μL samples can be directly spotted above the inlet port of the TESLI, infused into the chip upon vacuum activation, and partitioned into nanoliter droplets upon pressure activation, thereby facilitating compatibility with automated sample injection with reduced waste. In addition, TESLI also allows simple and efficient washing and sample switching, thus avoiding cross-contamination between successive samples. Moreover, to minimize the idle time, we have implemented two units of the TESLI in our chip to parallelize and alternate their operation. That is, we can continuously load and generate droplets from a sample in one TESLI while cleaning and switching a new sample in the other TESLI. As an additional benefit, we have also incorporated in-line droplet incubation and fluorescence-based droplet detection in our chip. For demonstration, we developed a chip with dual TESLIs that processed 44 0.7 μL samples into droplets with nanoliter wastages, zero idle time, and amenability for automation.

Results and Discussion

Overview of Tubing-Free Sample Loading and Sample-to-Droplet Device

Figure 2:
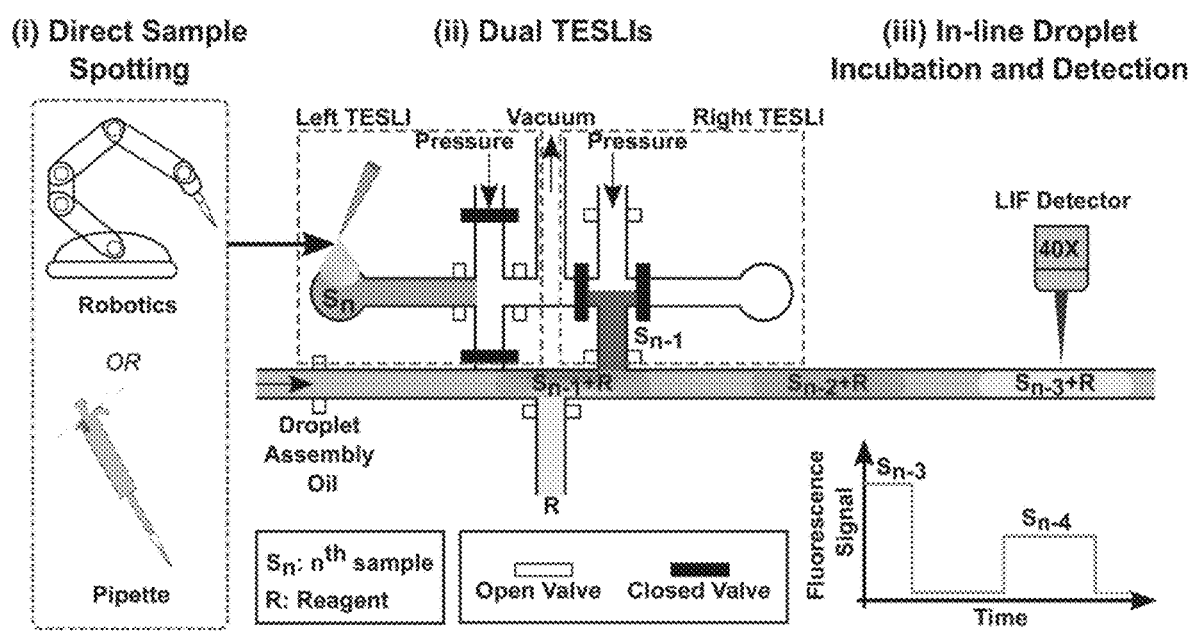
FIG. 2 is a schematic illustration of some additional details of a tubing-free, sample-to-droplet microfluidic system according to an embodiment of the invention.

Our novel TESLI is realized by a programmable network of vacuum and pressure control and is further integrated with in-line incubation and detection into a monolithic device (FIG. 2). This is an example corresponding to FIGS. 1A and 1B, for example. In our device, rather than preloading the samples in tubing and then inserting the tubing into inlet ports, samples can be directly infused into the device upon spotting over the inlet ports (FIG. 2, section (i)). This is accomplished by a network of programmable microfluidic valves, which first activates a vacuum source for infusing the spotted sample into the device, and subsequently regulates a pressure source for generating droplets from the infused sample. Moreover, a pair of TESLIs are incorporated in the same device to mediate parallelized operation that minimizes the idle time (FIG. 2, section (ii)). As a newly spotted sample ($S_n$) is drawn into the device via vacuum, a previously loaded sample ($S_{n-1}$) is concurrently pressurized into the central channel, mixed with the reagent (R) and discretized by the oil phase into droplets (FIG. 2, section (ii)). Such parallelized operation can avoid the unnecessary downtime when switching samples. To ensure the compatibility with chemical assays, we incorporate the reagent channel that can inject reagent with preprogramed volume and create droplets with preprogrammed composition. The generated droplets are propelled for in-line incubation with fixed spatial positions such that the order of the droplets determines droplet contents (FIG. 2, section (ii)). The in-line laser induced fluorescence (LIF) detection system then measures the fluorescence signal for each droplet, resulting in a fluorescence trace for analysis (FIG. 2, section (ii)).

In FIG. 2 the integrated system is includes (i) direct sample spotting, (ii) dual TESLIs (two identical TESLIs), and (iii) in-line droplet incubation and detection. Each sample is directly spotted onto the open-to-atmosphere inlet port with either robotics or pipettes (i). When a new sample (Sn) is driven into the chip from the left TESLI by opening the valves regulating the vacuum source, the previously loaded sample (Sn−1) from the right TESLI along with the assay reagent are pressurized to form nanodroplets with programmed compositions by opening the valves controlling the pressure sources (ii). The simultaneous sample switching and droplets generation between the two identical TESLIs are achieved by shifting the valves controlling the vacuum source and pressure source. After being incubated, the nanodroplets are further pushed downstream to the detection zone that incorporates LIF detector to capture the fluorescence signals for later analysis (iii).

Figures 3, 3A, 3B:
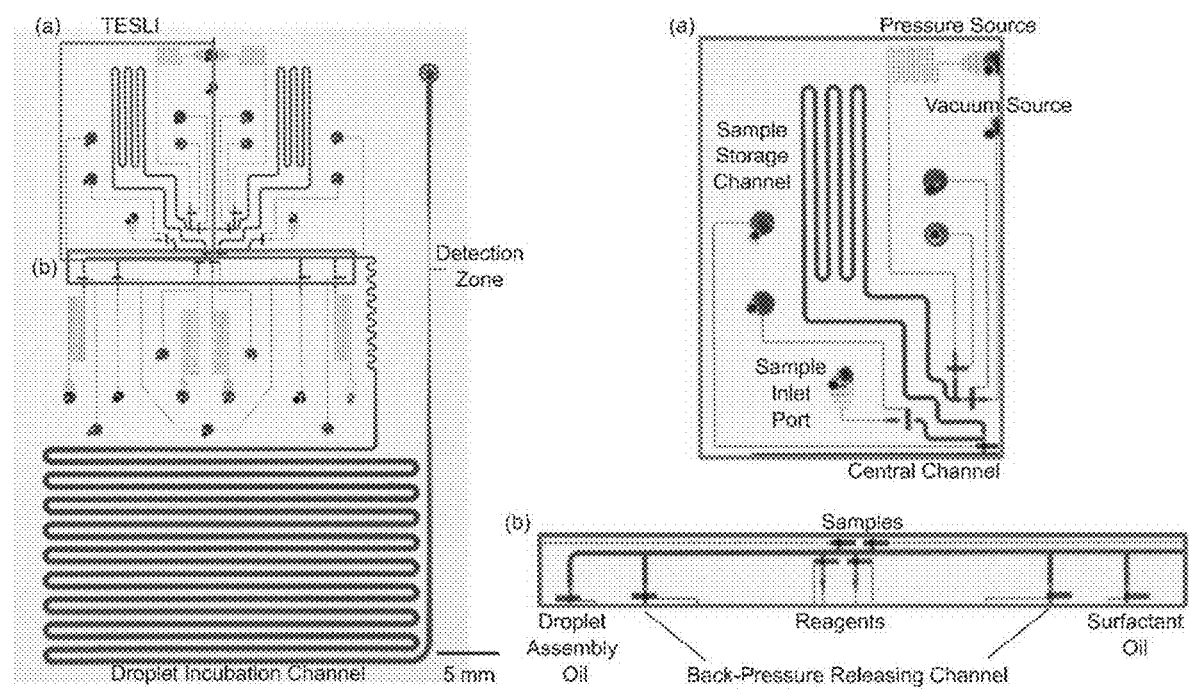
FIG. 3 shows an example of an integrated microfluidic chip that can be used with the systems of FIGS. 1A, 1B, and 2 according to an embodiment of the invention.
FIG. 3A corresponds to the section (a) in FIG. 3.
FIG. 3B corresponds to the section (b) in FIG. 3.

We designed and fabricated an integrated device for demonstrating tubing-free and scalable sample-to-droplet production with in-line incubation and detection (FIGS. 3, 3A and 3B). The device adopted a two-layer architecture with the valve layer at the bottom to achieve precise "push-up" microvalve control[25] that regulated the fluid flow in the fluidic layer. This device used the general integrated structure as we demonstrated previously [26-28] in that the generated droplets were propelled by the oil to flow through the mixing channel, incubation channel, and finally the detection channel. Each TESLI was composed of a sample inlet port, a sample storage channel, a vacuum source, and a pressure source (FIG. 3A). The sample inlet port was open to atmosphere without any tubing, which was designated for spotting the samples. The sample storage channel was designed to store 700 nL of the infused sample, which was later pressurized into droplets. The same pressure source and vacuum source were shared by the pair of the TESLIs, which were regulated by the microfluidic valves. To use pneumatic valves for droplet generation, one droplet assembly oil, two sample nozzles, two back-pressure releasing outlets, and two reagent nozzles were fed into the 200 μm central channel (FIG. 3B). The two back-pressure releasing outlets were added to maintain consistent droplet volume during droplet generation, which can be opened to atmosphere to alleviate the build-up back-pressure. The surfactant oil located downstream to the central channel was used to pre-treat the incubation channel wall to avoid droplets sticking to the device channel surface and ensure stable droplet movements. A 10-μm-wide detection constriction downstream the incubation channel was added to squeeze the nanodroplets and facilitate longer fluorescence detection time.

FIG. 3 shows an embodiment of an integrated microfluidic chip that is a two-layer PDMS chip that includes a top fluidic layer where droplets are generated, incubated, and detected and a bottom valve layer where microvalves are actuated to regulate droplet generation and flow. The chip houses two TESLIs, each TESLI (a) is composed of a sample inlet port for directly spotting samples, a sample storage channel for storing the infused samples, a vacuum source for sample infusion and a pressure source for generating droplets. The droplet generation is conducted in the (b) 200-μL wide central channel with one droplet assembly oil inlet, one surfactant oil treatment inlet, two reagent inlets, two sample inlets, and two back-pressure releasing channel. Generated droplets were pushed downstream by droplet assembly oil for mixing and incubation, which eventually flowed through the detection channel for fluorescence signal collection by a LIF detector.

Operation of TESLI

Figure 4A:
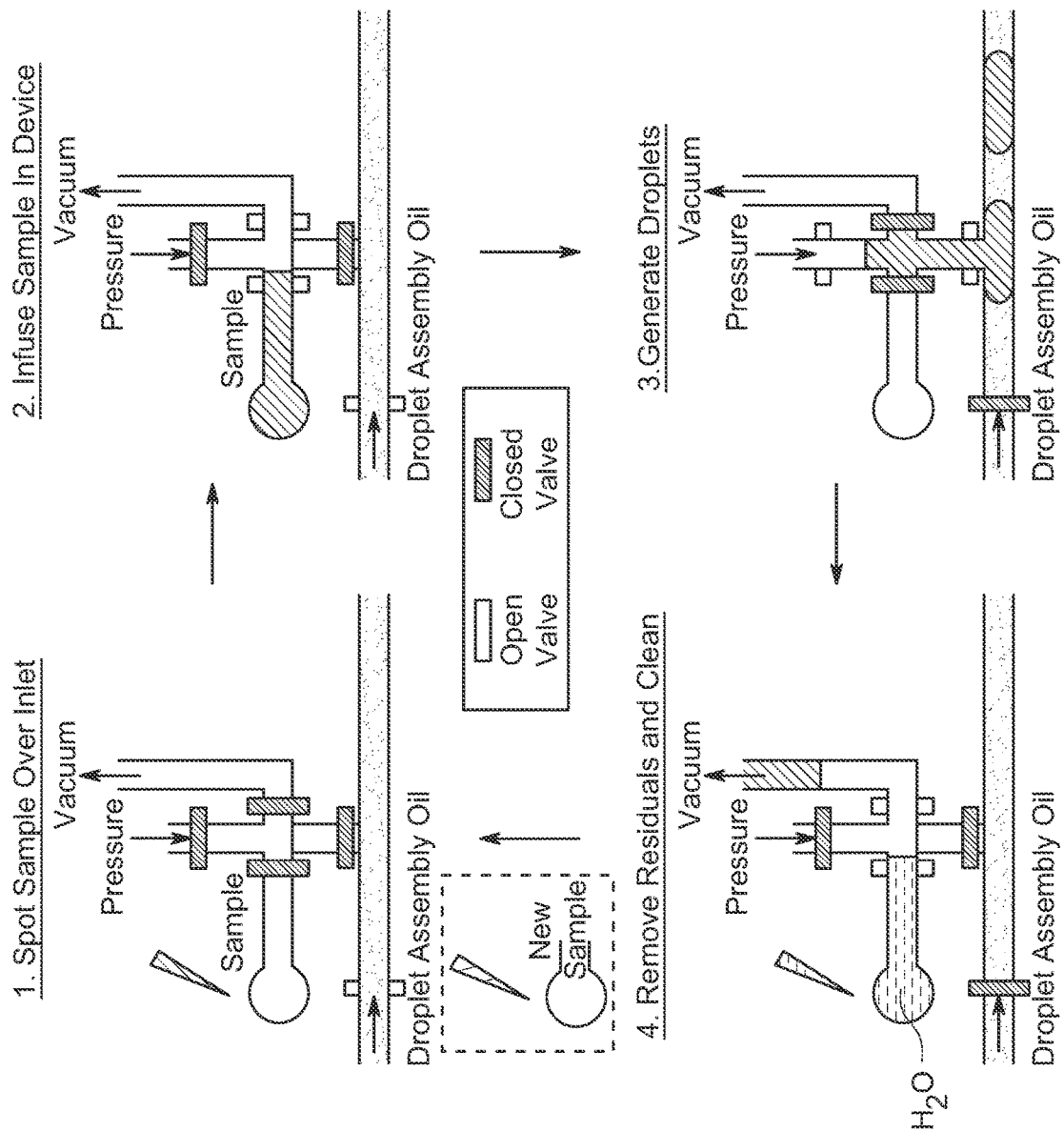
FIGS. 4A-4E show the operation of TESLI and sample-to-droplet device according to an embodiment of the current invention as one non-limiting example.
Figure 4B:
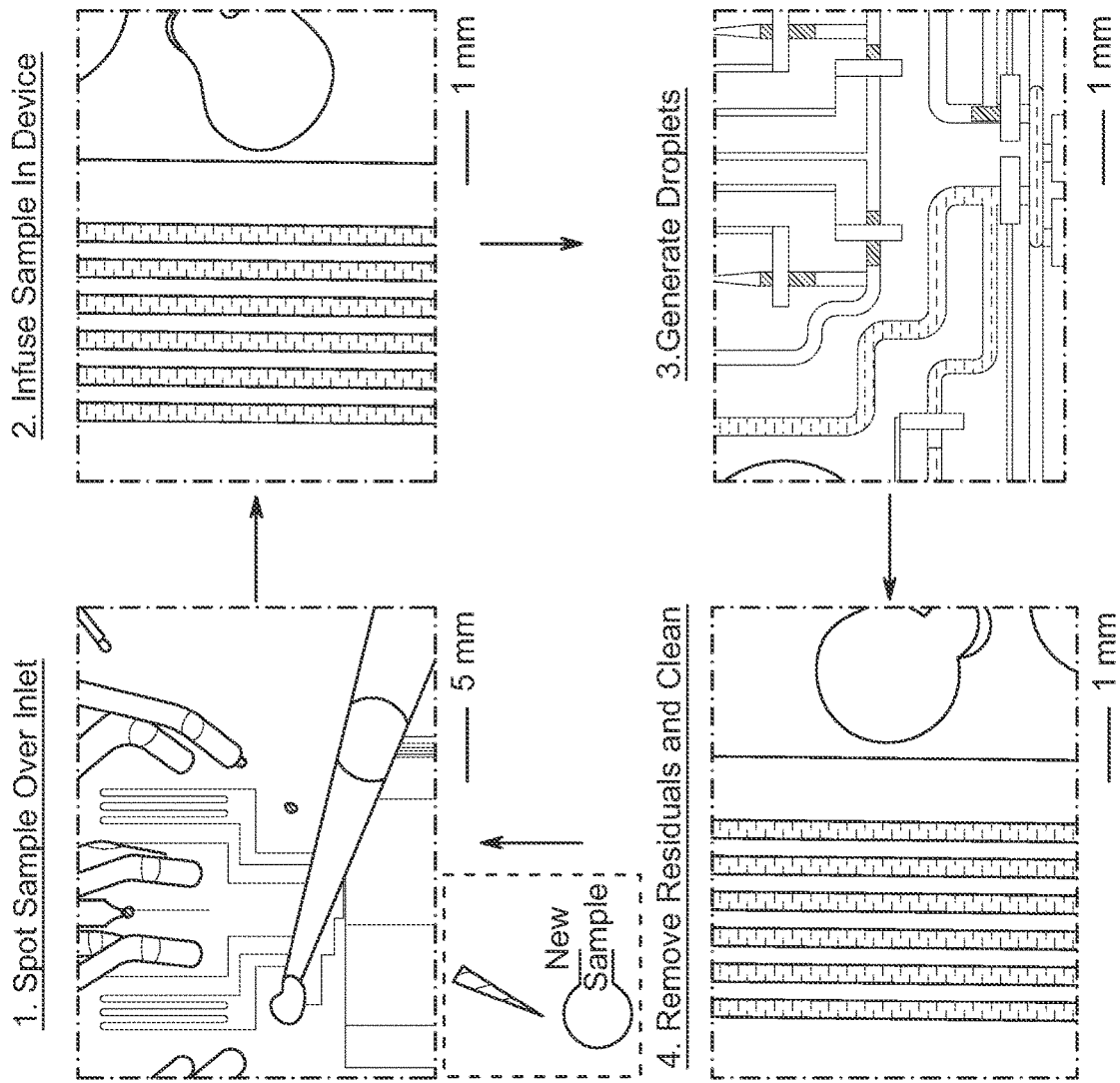
Figure 4C:
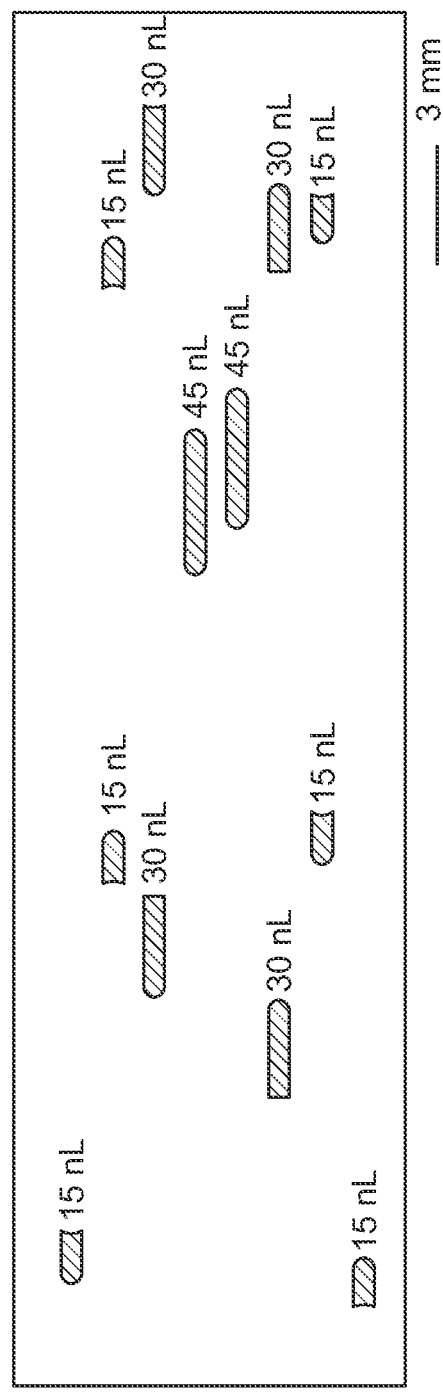

Each TESLI operates in a 4-step cycle: spotting sample over the inlet, infusing and storing sample in the device, generating droplets from the infused sample, and cleaning any unused sample in the device (FIG. 4A). For each new sample, TESLI simply repeats the cycle, thereby allowing a highly scalable operation without facing limitations as the tubing-based systems. Using food dye as the sample, we demonstrate this 4-step operation (FIG. 4B). We first spotted a 0.7 μL drop of the sample over the inlet (FIG. 4B, section (1)). We then activated vacuum to infuse the sample into the storage channel of the device (FIG. 4B, section (2)). We next activated pressure under a pre-programmed sequence to generate nanodroplets into the main channel of the device (FIG. 4B, section (3)). As an example of programmable droplet generation from an infused sample, we generated a train of nanodroplets with various volumes and replicates—3 replicates of ~15 nL droplets, 2 replicates of ~30 nL droplets, and 1 ~45 nL droplet followed by the reversed order of 1 ~45 nL droplet, 2 replicates of ~30 nL droplets, and 3 replicates of ~15 nL droplets (FIG. 4C). Finally, we activated vacuum to remove any unused sample and clean the storage channel with air and water spotted over the inlet (FIG. 4B, section (4)), readying the TESLI for the next sample.

Figure 4D:
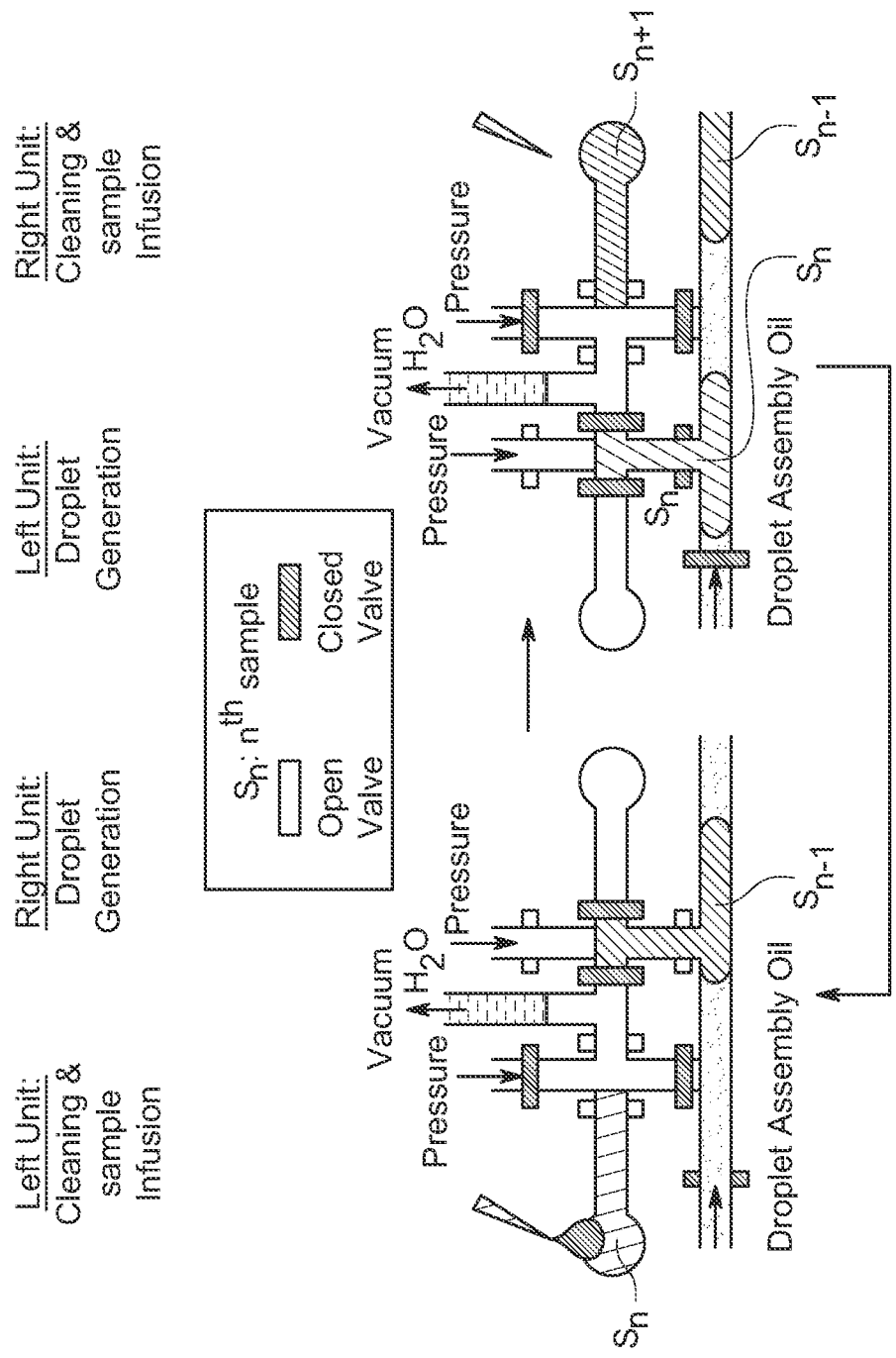
Figure 4E:
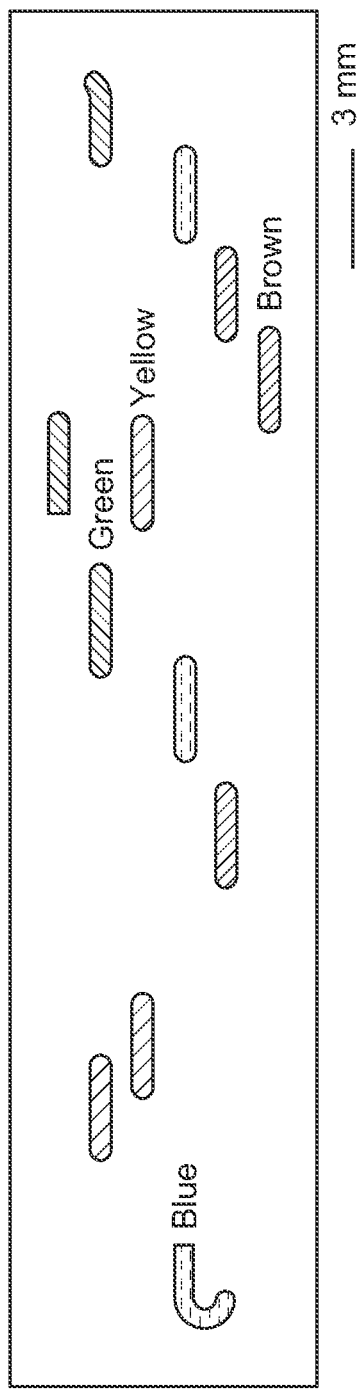

To improve the scalability of our device and reduce the idle time between the successive infused samples, we added an identical TESLI into our device and alternated the operation of two units of TELSIs (FIG. 4D). Specifically, while one TESLI unit generated droplets, the other TESLI unit was cleaned before infusing the next sample. The two TESLIs then alternated functions for every additional new sample, thereby minimizing the idle time from cleaning and sample switching and improving the throughput of our device. As a simple demonstration for the sample switching capacity of our device, we used 2 TESLIs to infuse 4 food dyes (brown, blue, yellow, and green) and generate 3 nanodroplets for each food dye (FIG. 4E). The alternating operation of the 2 TESLIs enabled the infusion of these 4 samples and the production of these nanodroplets with zero idle time, proved by the uniform spacing between different samples under continuous oil flow.

FIGS. 4A-4E show the operation of TESLI and sample-to-droplet device according to an embodiment of the current invention as one non-limiting example. FIG. 4A shows (a), each TESLI operates in a 4-step cycle (shown here in a schematic) in this example: 1. spotting sample over inlet, 2. infusing sample in device, 3. generate droplets, and 4. removing residuals and cleaning. In FIG. 4B, (b), the 4-step operation is demonstrated in the device using blue food dye as the sample. Of note, the channel in step 2 serves to store the entire sample such that it can be discretized into pre-programed number and volume of nanodroplets with minimal wastage. In FIG. 4C, (c), for demonstration of our programmable nanodroplet generation upon sample loading, a green food dye is loaded as the sample, from which a train of nanodroplets with various volumes and replicates are generated including 3 replicates of ~15 nL droplets, 2 replicates of ~30 nL droplets, and 1 ~45 nL droplet followed by the reversed order of 1 ~45 nL droplet, 2 replicates of ~30 nL droplets, and 3 replicates of ~15 nL droplets. FIG. 4D shows (d), that to reduce the downtime between infusing samples, two units of TESLIs are implemented in a single device for parallelized operation such that when one TESLI unit is generating droplets, the other TESLI unit is cleaning and infusing the next sample simultaneously. FIG. 4E shows in (e) for visual demonstration of loading multiple samples, we used the 2 TESLIs to infuse 4 food dyes (brown, blue, yellow, and green) and generated 3 ~30 nL nanodroplets from each food dye.

Characterization of Cleaning Efficiency and Dead Volume

Figure 5A:
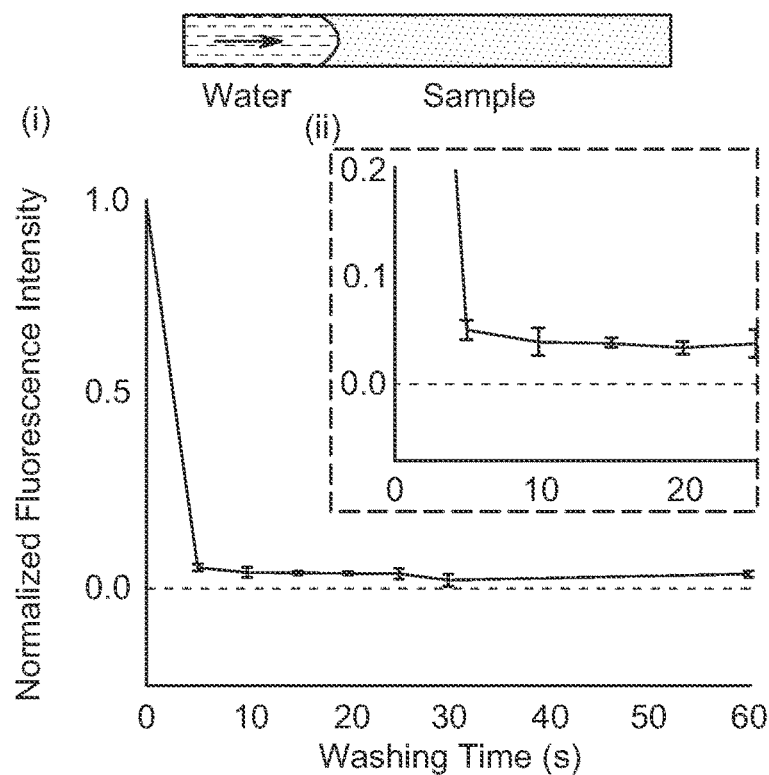
FIGS. 5A-5F provide characterization of washing and dead volume in this example, according to an embodiment of the invention.
Figure 5B:
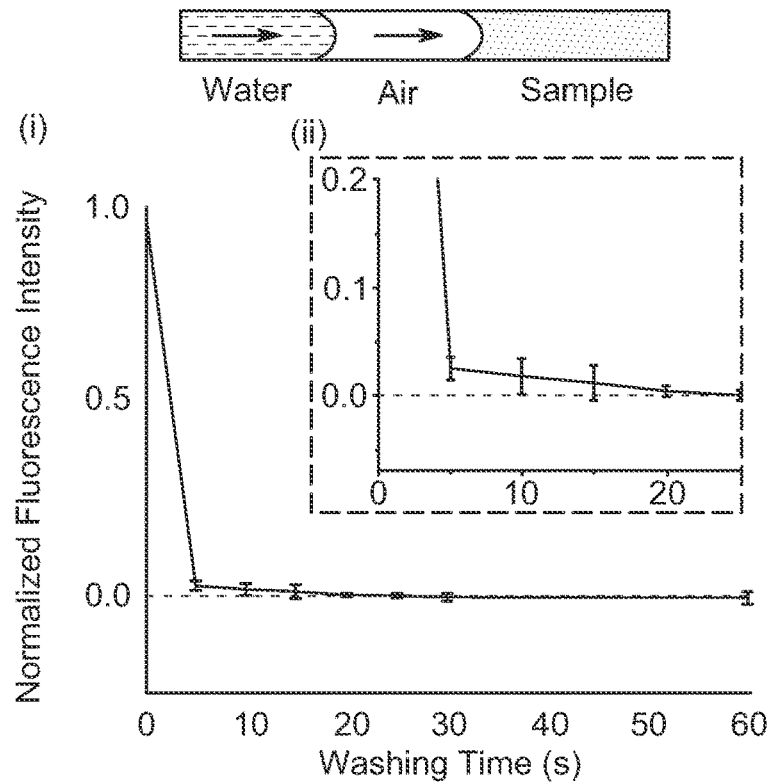
Figure 5C:
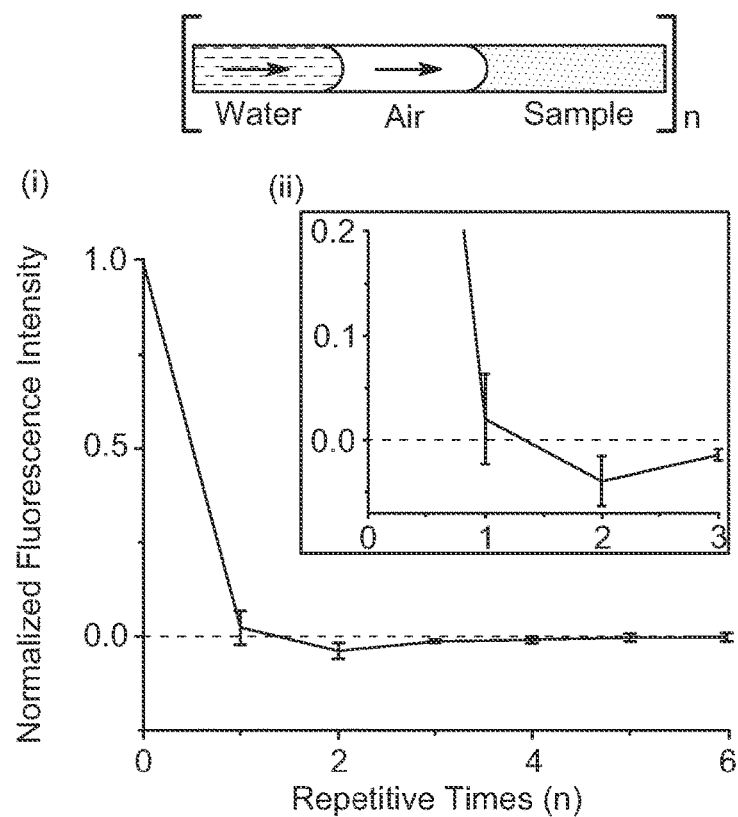

Because we used the same TESLI to repeatedly infuse samples, the risk for cross-contamination must be minimized through effective cleaning. We therefore evaluated 3 protocols for cleaning the TESLI. Here, we infused FAM (the most used green fluorescent dye) as the sample into our device before we initiated one of the three cleaning protocols—direct continuous water wash (FIG. 5A), air evacuation followed by continuous water wash (FIG. 5B), and repeated cycles of air evacuation and brief water wash (FIG. 5C). We acquired fluorescence images of the sample storage channel and measured the fluorescence upon FAM infusion and throughout the cleaning protocol for evaluating cleaning efficiencies of the 3 protocols. The results showed a quick drop of the fluorescence intensity and later stabilized fluorescence intensity among three washing methods, which indicated the high washing effectiveness. However, to minimize the cross-contamination of different samples, it was necessary to compare the minute difference among the signals (FIG. 5A, 5B, 5C, zoom-in figure). As a result, the fluorescence intensity of the last two washing methods showed the ability to achieve the zero-fluorescence intensity (FIG. 5A, 5B, 5C, red dashed line) while the fluorescence intensity using the first method is still above zero. Between the last two washing methods that both showed sufficient washing efficiency, we decided to apply the second washing method, continuous water washing with pre-air evacuation, throughout the experiment because of the simpler operation with single water pipetting instead of repetitive pipetting.

Figure 5D:
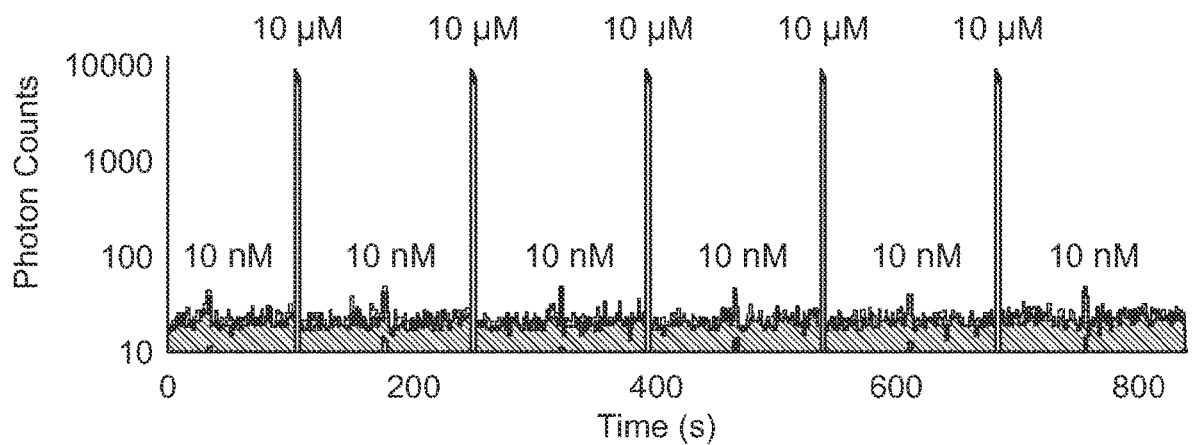
Figure 5E:
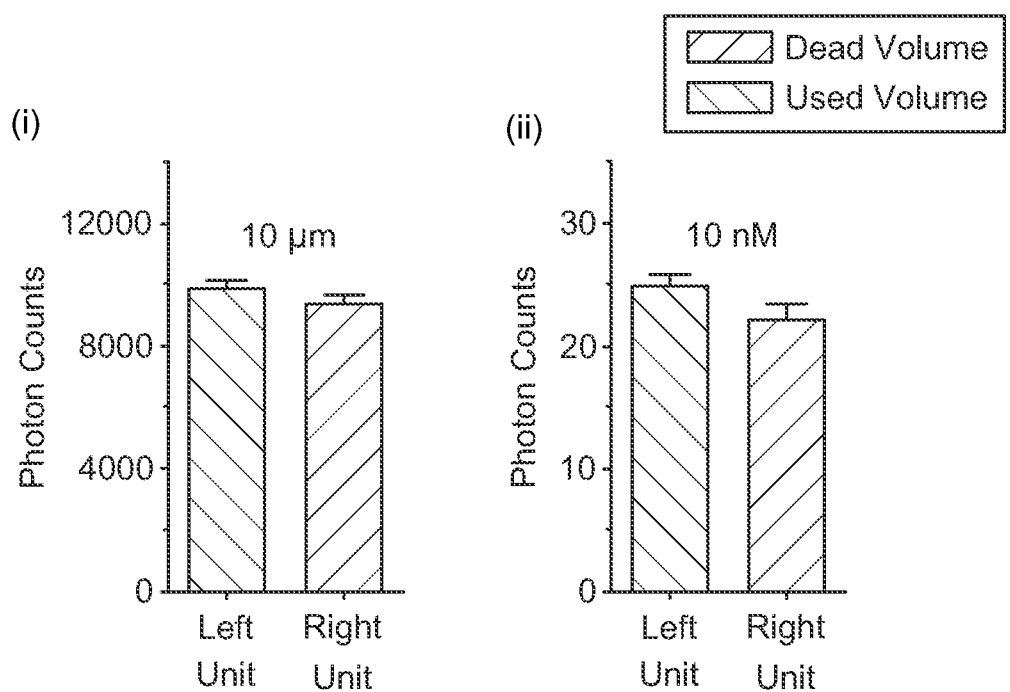

As additional verification for the high washing efficiency, we repetitively loaded FAM with 1000-fold difference in concentration, 10 µM and 10 nM, through the same TESLI, generated a droplet, and detected the fluorescence of the droplet. We observed consistent fluorescence from the droplets with 10 nM dye (FIG. 5D), which could only be achieved if the previous 10 µM dye was effectively cleaned using the second washing method (FIG. 5D). Moreover, both the left and the right TESLI units were confirmed with similar washing efficiency (FIG. 5E). These results thus provided strong supports for effective cleaning of TESLI via air evacuation and continuous water wash.

Figure 5F:
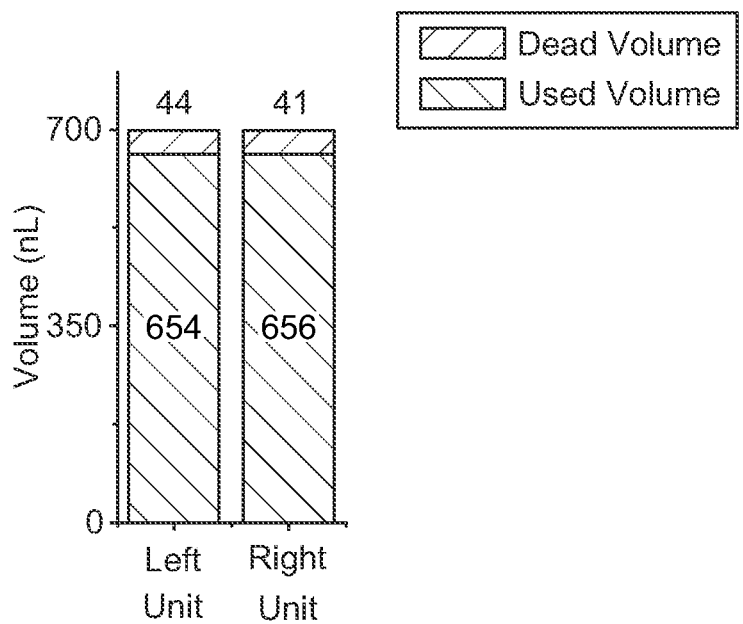

We calculated the dead volume of the sample storage channel to show the small sample wastage. The storage channel was first filled with around 700-nL DI water, which was used to constantly generate 35-nL droplets. The dead volume was calculated as the difference between the sum of the droplet volume and the 700-nL input volume, which were 44 nL and 41 nL respectively for left and right TESLI storage channels (FIG. 5F). Majority of the dead volume came from the design of the device, as there was a dead-end channel that cannot be pressurized. This design was sacrificed to achieve a better organization of the valves and the nozzles. However, when there were sample residues left in the storage channel, direct washing with deionized water worked as dilution and was not efficient for quick wash. This explained why the first washing method was not sufficient after short time washing compared with the other two methods that cleared the residues first (FIG. 5A, 5B, 5C).

FIGS. 5A-5F shoe the washing efficiency results of three different washing methods with (a) continuous water washing, (b) air evacuation before continuous water washing, and (c) repetitive air rinsing and water rinsing. The fluorescence intensity of the sample storage channel is normalized to the channel intensity when filled with 125 nM FAM fluorescence dye. Zero intensity (red dashed line) was referring to the intensity of the clean channel when filled with deionized water. The zoom-in figures with blue dashed borders were used to compare the minute difference between the results. (d) Six droplets of 10 nM FAM with 10 µM FAM in between the droplets were generated to evaluate the washing efficiency, where stable fluorescence signals were obtained. (e) Both left and right units of TESLIs were verified with similar washing efficiency. (f) The dead volume of the left and right units of TESLIs were evaluated as the difference between the total droplet volume or the used volume and the total input volume. In (a), (b), (c), and (e), the error bars depict ±1 standard deviation.

Scalable Sample Infusion and Detection

Finally, we focused demonstrating the scalability of our device in sample loading. Here, we used various concentrations of FAM as samples and a constant concentration of resorufin (a red fluorescent dye) as the reagent, and generated nanodroplets that combined both dyes such that they can be simultaneously detected via our two-color LIF detector. To properly execute the final demonstration, we performed additional characterizations for our device and LIF detector. We first calibrated the valve opening time with the droplet volume under two different operation pressures for sample channels and reagent channels respectively to precisely control the composition and the ratio of the sample and the reagent in each nanodroplet. We then tuned the laser power of the LIF detector and found that 1 mW laser power would allow us to properly detect the various concentrations of FAM in our simulated experiment. Finally, we measured the intensities of unwanted crosstalk signal in the resorufin channel that originated from only FAM so that any crosstalk signal in the final experiment could be subtracted from the real resorufin fluorescence signal.

Using only 2 TESLIs in a single device, we repeated 4 times the infusion of 11 FAM dyes at various concentrations, for a total of 44 samples. The 11 FAM dyes were in a scrambled order—1 µM, 40 nM, 4 µM, 400 nM, 20 nM, 200 nM, 10 nM, 0 nM (i.e., water), 2 µM, 100 nM, and 10 µM—to simulate distinct samples. Upon infusion, each sample was used to generate a nanodroplet with an equal volume of 2 µM resorufin. As a result, in the nanodroplets, the FAM concentrations were halved and the resorufin concentration was a constant 1 µM. Of note, here we emphasized on sample loading and therefore generated one nanodroplet with a fixed concentration of resorufin per sample, but multiple nanodroplets with various concentrations of resorufin can be readily achieved, as we demonstrated through food dyes (FIGS. 4A-4E) and in our earlier works [26-28]. Upon in-line incubation and fluorescence detection, in the resulting fluorescence trace, we observed nanodroplets with distinct FAM intensities that corresponded with the order of sample infusion (FIG. 6A, part (i)). Also, in the resulting fluorescence trace, we also observed a uniform resorufin intensity across all nanodroplets (FIG. 6A, part (ii)). When we repeated the same process three more times in the same device, we acquired similar fluorescence traces and consistent FAM and resorufin intensities (FIG. 6B). These results thus provide a strong support that within a device with 2 TESLIs, we achieved successful infusion of 44 samples with minimal cross-contamination between successive samples, as well as reliable nanodroplet generation and in-line incubation and detection.

Figure 6A:
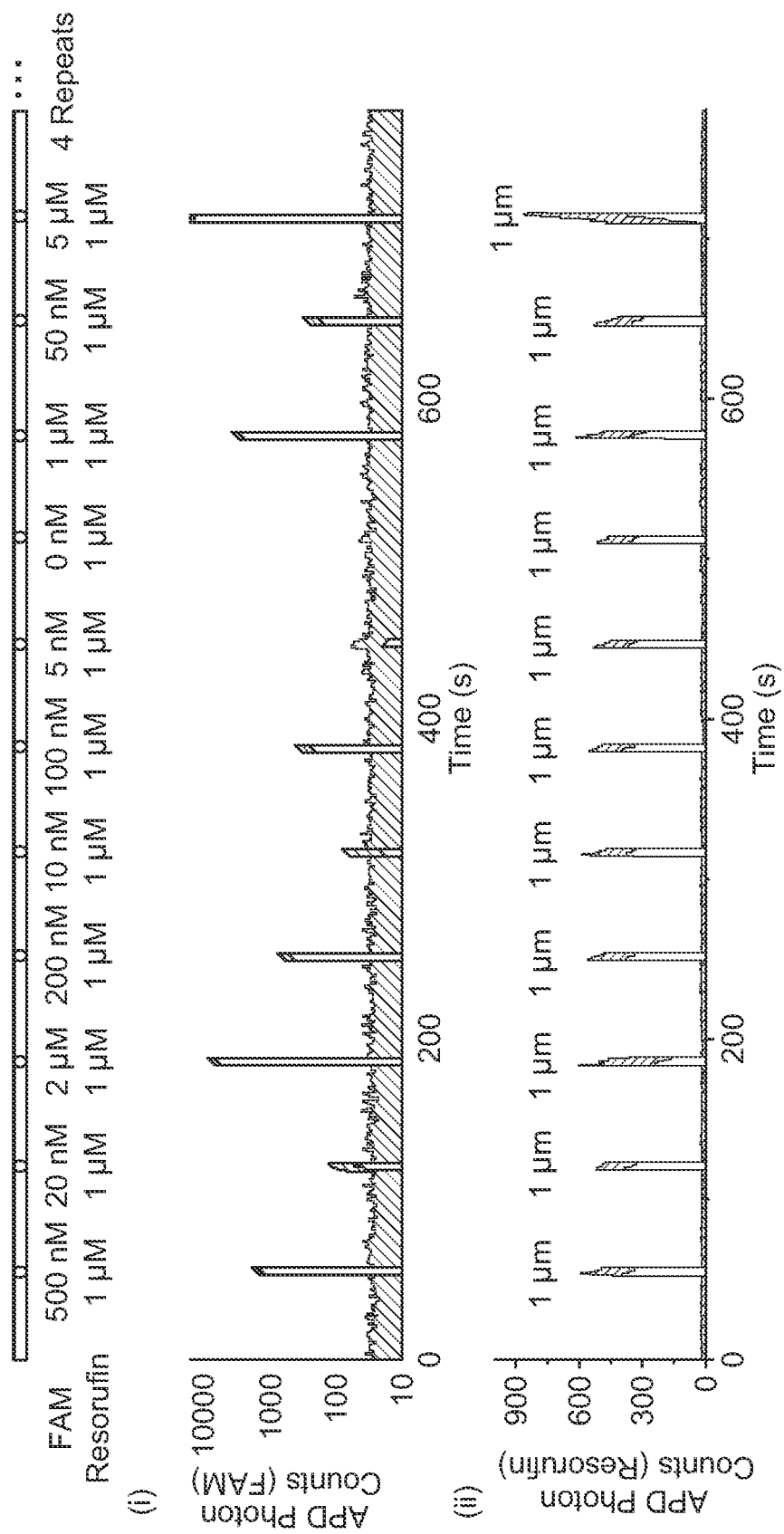
FIGS. 6A-6B provide a demonstration of scalable sample loading in an example, according to an embodiment of the invention.
Figure 6B:
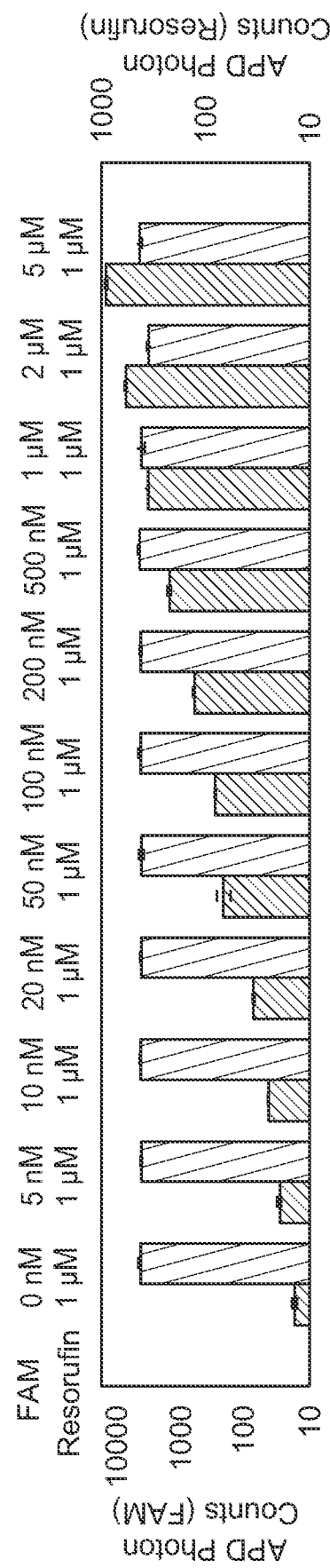

FIGS. 6A-6B show, (a) eleven concentrations of FAM dye that function as distinct samples are loaded in a scrambled sequence through the dual TESLIs into the sample-to-droplet device and assembled with resorufin at 1:1 ratio to generate distinct nanodroplets. To emphasize on sample loading and switching, only one nanodroplet is generated per FAM sample. The sequence of the nanodroplets based on their FAM final concentrations is 500 nM, 20 nM, 1 µM, 200 nM, 10 nM, 100 nM, 5 nM, 0 nM (i.e., water), 1 µM, 50 nM, and 5 µM, and all nanodroplets contain 1 µM resorufin. The nanodroplets are briefly incubated in the device and fluorescently detected via a custom laser induced fluorescence detector equipped with avalanche photodiodes (APDs). In FIG. 6A, part (i) the APD photon counts in the FAM detection channel for the 11 nanodroplets increase and decrease in accordance to the FAM concentration of the scrambled loading sequence, while (FIG. 6A, part (ii)) the APD photon counts in the resorufin channel for all 11 sample droplets are uniform (after subtracting crosstalk fluorescence signal from FAM), consistent with the uniform resorufin concentration. In FIG. 6B, (b) the same 11 concentrations of FAM dye are repeated 4 times in the same scrambled order screened for four times and we obtained comparable results among them (b). The error bars depict ±1 standard deviation.

Conclusion

In this example according to an embodiment of the current invention, we introduce a nanodroplet device that is incorporated with our novel TESLI that unlocks the scalability restriction, minimizes the dead volume, and avoids the downtime for switching samples. Our device utilizes programmable microfluidics valves for regulating the vacuum-induced sample infusion and pressure-driven droplet generation with precisely controlled droplet volume and composition. Each device is equipped with two identical TESLIs to achieve parallelized operations to increase the overall throughput. The generated droplets flow through the passive mixer or serpentine-shaped channel, the on-chip incubation region, and eventually the detection zone. In-house LIF system detects the fluorescence signals, in which the order or sequence of the droplets determined the content or test compound in the droplets. We have herein demonstrated our platform by processing 44 samples with a pair of TESLIs and showed minimal cross-contamination between successive samples and stable production line operation. Such TESLI could serve as the bridge between droplets microfluidics and pipetting robotics toward a fully automated system.

The integrated system automates every operation step after the sample is spotted onto the device, starting from the loading of samples to droplet generation to incubation to detection. Such automated system obviates labor-intensive manual preparation of the reaction and avoids human errors. Currently, we manually pipette samples and deionized water throughout the experiments. Pipetting robotics such as OpenLH [29] and other open-source pipetting systems [30] can be integrated to achieve fully automated operation and enable the possibility of large-scale screening in the future. Such integration is still not feasible for most tubing-based droplet systems, but TESLI opens the door for it.

The feasibility of TESLI has been demonstrated with pneumatic valve-based droplet generation method in this device, which could be explored to further integrate with other droplet generation techniques [31]. More specifically, we believe TESLI can serve as the universal upstream sample processing unit that provides the downstream droplet generation unit the customizability capability and unlimited scalability. For instance, a previously demonstrated platform, integrated Programmable Picodroplet Assembler (iPPA) [32], combined pneumatic valves and flow-focusing junction to achieve customizability of the droplet contents. However, the total number of samples or combinations that iPPA can handle was restricted by the tubing-based sample-to-chip interface because of the small footprint of the device and the limited number of pneumatic valves. By simply replacing the tubing with TESLI, iPPA can maximum the customizability capacity and tackle those restrictions.

Here we used fluorescence titration for the production-line demonstration of our systems, and we foresee many different chemical and biological assays to be explored in this device such as matrix metalloproteinase (MMP) screening [27], cytochrome P450 (CYP450) screening [33], luminescent nanomaterial cell screening assay [34], and other inhibitor and drug screening assays [35-37]. Additional technical enhancements are included in additional embodiments of this invention. First, the washing procedures were currently performed by pipetting water onto the device to be regulated by the TESLI. In the future, washing steps can be directly incorporated into the device to reduce the workload or the additional spotting steps of the user or the robotic system. Moreover, more than two TESLIs could be incorporated into the same device to simultaneously process more samples, which could be important for high-throughput screening (HTS) applications and scale up the HTS capability. With these future optimizations, TESLI can be a facile sample loading approach for many applications that interface with droplet microfluidics such as biochemistry, chemical synthesis, and micro and nanotechnology.

Materials and Methods

Device Design

The microfluidics chip is composed of two PDMS layers with one fluidics layer for nanodroplet generation, mixing, incubation, and detection and one valve layer that controls of the actuation of the microvalves. The fluidics layer is designed with 11 distinct inlet and outlet ports, including two sample inlets, one pressure inlet, one vacuum outlet, two oil inlets, two pressure-release outlets, two reagent inlets, and one sample outlet. The droplet generation and assembly are taken place at a central channel with width of 200 μm to help squeeze the droplet for better merging of different reagents and samples. A mixing channel with serpentine shape is subsequently placed after the central channel to help the mixing of different chemical or biological contents in the droplets. Immediately downstream the mixing channel, the channel gradually widens and connects to a serpentine incubation channel that is 500 μm wide and 50 cm long. The end of the incubation channels is narrowed into a 100-μm-wide detection constriction, where the detected nanodroplets eventually flow into the device outlet port. The bottom valve layer consists of 13 ports that control the actuation of the 13 microvalves. Among the 13 microvalves, one microvalve controls the droplet assembly oil, one microvalve controls the surfactant oil, two microvalves control the vacuum outlet, two microvalves control the pressure inlet, one microvalve controls the pressure releasing outlets, two microvalves control the sample loading inlets, and four microvalves control the assembly of the samples and reagents.

Master Mold Fabrication

The photomasks for both PDMS layers were designed using AutoCAD 2020 (Autodesk, San Rafael, CA, USA) and the mask patterns were printed onto high precision transparencies at 20,000 dpi by CAD/Art Services Inc. (Bandon, OR, USA). The master mold for both fluidics layer and valve layer were fabricated using standard photolithography on 4-inch silicon wafers (Polishing Corporation of America, Santa Clara, CA, USA). To fabricate the mold for the fluidic layer, SPR-220-7 (positive photoresist; Microchem Corp., Newton, MA, USA) was initially spin-coated onto the wafer with a height of 35 μm, which served as the segment to interact with the bottom valve layer due to the rounded cross-section of SPR-220-7 after hard baking. The push-up valve architecture of the chip allows the bottom valve layer to collapse into the top fluidics layer patterned with SPR-220-7 to achieve tight valve sealing or closing. The remaining fluidic channels that were not interacting with microvalves were fabricated by spin-coating additional layer of SU8-3025 (negative photoresist; Microchem Corp., Newton, MA, USA) onto the silicon wafer with a height of 50 μm. The SU-8 and SPR-220-7 channels were aligned with mask aligner using the predesigned alignment markers. The mold of the valve control layer was patterned with single layer of SU8-3025 (negative photoresist; Microchem Corp., Newton, MA, USA) with a height of 30 µm via standard photolithography.

Microfluidics Device Fabrication

The device was fabricated with polydimethylsiloxane (PDMS) using multilayer soft lithography. Both molds were firstly silanized with chlorotrimethylsilane (Sigma-Aldrich, St. Louis, MO, USA) in the desiccator for 10 minutes to reduce the adhesion between the PDMS and the photoresist on the molds. The thin valve layer was obtained by spin coating PDMS (SYLGARD 184 Silicone Elastomer Kit, Dow Corning, Midland, MI, USA) with 15:1 base to curing agent ratio on the mold of the valve control layer at 1000 rpm and subsequently curing for 20 min at 80° C. The thick fluidic layer was prepared by pouring 51.7 g of 10:1 (PDMS base to curing agent ratio) on the fluidic mold and baking for 20 min at 80° C. After the baking of both molds, the cured PDMS on the fluidic mold was peeled off while the cured PDMS on the valve control mold were retained. The peeled PDMS and the PDMS coated valve control mold were then manually aligned and bonded under Stemi DV4 Microscopy (Carl Zeiss AG, Oberkochen, Germany) followed with oxygen plasma treatment (42 W, 500 mTorr, 45 s). After 5 minutes post-baking at 80° C., the fluidics PDMS layer and the valve control PDMS layer were permanently bonded and the bonded double-layer PDMS was peeled off for punching holes through all the ports. The double-layer PDMS was then permanently bonded with 48×65 mm cover glass (Thermo Fisher Scientific, Waltham, MA, USA) with oxygen plasma treatment (42 W, 500 mTorr, 45 s) and 5-minute post baking at 80° C. The fabricated microfluidic chip was then stored in the oven for ~48 hours at 80° C. before the operation.

Device Operation

The nanodroplets were assembled by programmatically actuating the microvalves that were interacted with a set of solenoid valves controlled by custom codes written in MATLAB (MathWorks, Natick, MA, USA). The interface between the microvalves and the solenoid valves were water-filled Tygon microbore tubing (0.02-inch ID and 0.06-inch OD; Cole-Partner, Vernon Hills, IL, USA) connected to 23-gauge blunt needles (McMaster-Carr), which were inserted at the designated valve inlet ports. Pressure was set to be 30 psi to ensure fully closed valves during the operation to avoid the cross talk. By controlling the opening and closing of the microvalves that regulated the sample and reagent inlets, nanodroplets with desired composition and size were able to be generated. The oil for nanodroplet assembly was composed of fluorinated oil FC-40 (3M, Two Harbors, MN, USA) and nonionic fluorous-soluble surfactant 1H, 1H, 2H, 2H-perfluoro-1-octanol (PFO; Sigma-Aldrich) with a ratio of 4:1. We used the droplet generation oil for EvaGreen (BIO-RAD, Hercules, CA, USA) as the surfactant oil to pre-treat the incubation channel to avoid droplet sticking onto the channel wall. Both oils were pre-loaded in the Tygon microbore tubing and connected to the oil inlet ports with 23-gauge blunt needles. A simple vacuum trap was fabricated with one microcentrifuge tube (Eppendorf North America, CT, USA) and two Tygon microbore tubing as the bridge between the microfluidic device and the vacuum source, which served the role of storing all the wastes and avoiding the direct communication with the vacuum source. The microcentrifuge tube was firstly drilled with two holes for inserting the tubing, with one inserted all the way to the bottom and one inserted near the cap. The epoxy glue (3M, Saint Paul, MN, USA) was used to seal the gap between the tubing and the holes to ensure the vacuum environment in the microcentrifuge tube. The pressure input for all the inlets of the device were optimized and kept the same with 5 psi for reagent inlets, and 3.5 psi for nanodroplet assembly oil and sample inlets.

Before the operation, surfactant oil was first injected to fill the chip to pre-treat the incubation channels, which was later pushed out and refilled by droplet assembly oil. During the operation, each sample (~0.7 µL) was directly pipetted onto the device inlet while the TESLI activated the vacuum to draw the sample into the sample storage channels and wait for further instructions. Washing buffers were also pipetted onto the sample device inlet port by following the pre-designed queues. With the programmed instructions, the nanodroplet assembly, incubation, and detection were achieved automatically.

Evaluation of Washing Efficiency and Dead Volume

The washing efficiency of different washing protocols was calculated by obtaining the fluorescence images of the sample storage channels during the operation at different time points. We purchased FAM green fluorescence dye from Thermo Fisher Scientific (Waltham, MA, USA) and diluted it to 125 nM as the input sample. The images of the channels were captured by the digital single-lens reflex (DSLR) camera (EOS 60D; Canon, Inc., Tokyo, Japan) that was mounted on the fluorescence microscopy (Olympus IX71, Shinjuku, Tokyo, Japan) with a 1.25× magnification objective lens (Olympus PlanApo N, Shinjuku, Tokyo, Japan) and interacted with EOS Utility software (Canon U.S.A., Inc, Melville, NY, USA). During the image capturing, a filter with an excitation wavelength of 480 nm and an emission wavelength of 535 nm was used for the inputted FAM samples. The ISO and exposure time of the camera was set to be 6400 and 0"5' to capture images with fluorescence signals. The APT stepper motor controller (Thorlabs, Newton, US) was integrated with the stage of the fluorescence microscopy, which was turned on during the whole experiment to fix the location of the chip while making sure the measurements of the fluorescence intensity were from the identical channels.

The FAM dye was also diluted to 10 nM and 10 µM as the samples to evaluate the washing efficiency with the whole streamlined operation. The left and right TESLIs were evaluated separately. The operation started by pipetting a drop of 10 nM FAM sample onto the inlet port to be generated with one 50 nL droplet followed with subsequent air evacuation and additional pipetting of 7 µM water for channel washing. Upon washing, next 10 µM FAM sample was pipetted onto the same sample inlet port to be generated with one 50 nL droplet followed with the same washing instructions. The same process was repeated for 5 times with additional 10 nM FAM sample to be loaded at the end. A total of 11 droplets were then flowed through the incubation channel to be detected by our custom-built laser-induced fluorescence (LIF) system, which was incorporated with a 488-nm laser source (OBIS, Coherent, Inc) for excitation and a silicon avalanche photodiode (APD) for counting the photons. The laser was operated at 1 mW power and was focused into the narrowed detection zone using a ×40 objective (Thorlabs RMS40X-PF, NA 0.75, focal depth ~0.6 nm). The fluorescence signal emitted from the nanodroplets were continuously captured by the APD with 0.1-ms sampling time and recorded by the custom LABVIEW program (NI, Austin, TX, USA).

The dead volume of the sample storage channel was calculated by calculating the volume difference between the loaded sample inputs and the total volume of the generated nanodroplets. The sample storage channel was filled with water (~700 nL) to be programmatically controlled to digitize 50-nL droplets until running out of the loaded water. Image of each generated nanodroplet in the central channel was captured by the same camera setup used for evaluating the washing efficiency under bright field for further analysis.

Device Characterization

The valve opening time and the droplet volume were correlated to precisely control the droplet composition and size. Two operation pressures were used with 5 psi for reagent inlets and 3.5 psi for sample inlets. For reagent inlets, water was pre-loaded into Tygon microbore tubing to be inserted at the designated reagent inlet ports. Triplicate droplets were generated with different valve opening time ranging from 0.05 s to 0.35 s with a 0.05 s increment and an additional valve opening time of 0.03 s to cover lower end volume. For sample inlets, a drop of water was pipetted at the sample inlet port to be processed by TESLI. Triplicate droplets were generated with different valve opening time ranging from 0.05 s to 0.3 s with a 0.05 s increment. Bright field images for each droplet were captured by the digital single-lens reflex (DSLR) camera mounted on the same fluorescence microscopy setup mentioned before.

Laser power of the LIF detector was tuned to ensure wide dynamic range to detect the various concentrations of FAM samples. Four concentrations of FAM were prepared and diluted, 10 nM, 100 nM, 1 µM, and 10 µM. TESLI was used to process these samples with 12 droplets for each concentration. Generated droplets flowed through the incubation channel and were detected by our LIF system. The laser power was tuned to be 1 mW, 2 mW, 4 mW, and 10 mW in sequence for every three droplets. The photon counts for each droplet under different laser powers were recorded by the custom LABVIEW program for further analysis in MATLAB.

Fluorescence Sample Infusion and Detection

Two fluorescence dyes were purchased for demonstrating the device including FAM dye and resorufin dye (Thermo Fisher Scientific, Waltham, MA, USA). 11 concentrations of FAM dyes were prepared on the bench including 0 nM (i.e., water), 10 nM, 20 nM, 40 nM, 100 nM, 200 nM, 400 nM, 1 µM, 2 µM, 4 µM, and 10 µM. The loading sequence of the FAM dyes were randomized to be 1 µM, 40 nM, 4 µM, 400 nM, 20 nM, 200 nM, 10 nM, 0 nM (i.e., water), 2 µM, 100 nM, and 10 µM to better simulate the distinct samples. One concentration of resorufin dye of 2 µM were prepared and pre-loaded into Tygon microbore tubing to be inserted into the reagent inlet port. In order to capture fluorescence signals for two fluorescence dyes with different excitation and emission wavelengths, a dual-laser induced system that was incorporated with a 488-nm and a 552-nm laser source (OBIS, Coherent, Inc) for excitation and a silicon avalanche photodiode (APD) for counting the photons was used. Before the operation, we processed the 11 FAM dyes using our TESLI to generate one 50 nL droplet for each concentration, which was detected and measured using the resorufin channel (552-nm laser) as the crosstalk signal.

The operation was pre-designed to generate a 50 nL droplet mixed with FAM dye and resorufin dye with 1:1 ratio for each concentration of the 11 FAM dyes. Each FAM dye was pipetted onto the sample inlet port to be processed into nanodroplet followed with air evacuation and pipetting of 7 µL of water to clean the channels to prepare for the next sample to be loaded in. The 11 FAM dyes were processed for 4 times, which required 44 times of sample switching and channel cleaning in a continuous flow. The generated droplets were then flowed through the incubation channel and detected by our dual-laser induced system with 1 mw laser power. The photon counts for each nanodroplet were captured by the APD with a 0.1-ms sampling time and recorded by the custom LABVIEW program.

Data Analysis

During washing efficiency evaluation, all the fluorescence intensity measurements were acquired via ImageJ (NIH, Bethesda, MD, USA) and analyzed via Origin (Electronic Arts, Redwood City, CA, USA). For evaluating the dead volumes of the TESLI, the total volume of the generated nanodroplets was acquired by multiplying the droplet area obtained from ImageJ with the actual channel height measured by VK-X100K laser microscope (Keyence Corporation, Osaka, Japan). The images captured for correlation between valve opening time and droplet volume were also measured via ImageJ to acquire the droplet area to be multiplied with the channel height to obtain the droplet volume. The comparison, further data analysis, and plotting were done via Origin. The recorded fluorescence signal from the LAB VIEW program were all analyzed via MATLAB and Excel and plotted via Origin.

REFERENCES

[1] S.-Y. Teh, R. Lin, L.-H. Hung, A. P. Lee, Droplet microfluidics, Lab on a Chip, 8(2008) 198-220.

[2] S. Mashaghi, A. Abbaspourrad, D. A. Weitz, A. M. van Oijen, Droplet microfluidics: A tool for biology, chemistry and nanotechnology, TrAC Trends in Analytical Chemistry, 82(2016) 118-25.

[3] A. M. Nightingale, T. W. Phillips, J. H. Bannock, J. C. De Mello, Controlled multistep synthesis in a three-phase droplet reactor, Nature communications, 5(2014) 1-8.

[4] E. Garcia-Egido, V. Spikmans, S. Y. Wong, B. H. Warrington, Synthesis and analysis of combinatorial libraries performed in an automated micro reactor system, Lab on a Chip, 3(2003) 73-6.

[5] R. Obexer, A. Godina, X. Garrabou, P. R. Mittl, D. Baker, A. D. Griffiths, et al., Emergence of a catalytic tetrad during evolution of a highly active artificial aldolase, Nature chemistry, 9(2017) 50-6.

[6] F. Ma, M. T. Chung, Y. Yao, R. Nidetz, L. M. Lee, A. P. Liu, et al., Efficient molecular evolution to generate enantioselective enzymes using a dual-channel microfluidic droplet screening platform, Nature communications, 9(2018) 1-8.

[7] F. Eduati, R. Utharala, D. Madhavan, U. P. Neumann, T. Longerich, T. Cramer, et al., A microfluidics platform for combinatorial drug screening on cancer biopsies, Nature communications, 9(2018) 1-13.

[8] R. Abdelaziz, D. Disci-Zayed, M. K. Hedayati, J.-H. Pollls, A U Zillohu, B. Erkartal, et al., Green chemistry and nanofabrication in a levitated Leidenfrost drop, Nature communications, 4(2013) 1-10.

[9] J. Leng, J.-B. Salmon, Microfluidic crystallization, Lab on a Chip, 9(2009) 24-34.

[10] K. V. Kaler, R. Prakash, Droplet microfluidics for chip-based diagnostics, Sensors, 14(2014) 23283-306.

[11] D.-K. Kang, M. M. Ali, K. Zhang, E. J. Pone, W. Zhao, Droplet microfluidics for single-molecule and single-cell analysis in cancer research, diagnosis and therapy, TrAC Trends in Analytical Chemistry, 58(2014) 145-53.

[12] M. T. Guo, A. Rotem, J. A. Heyman, D. A. Weitz, Droplet microfluidics for high-throughput biological assays, Lab on a Chip, 12(2012) 2146-55.

[13] J. M. Ramsey, The burgeoning power of the shrinking laboratory, Nature Biotechnology, 17(1999) 1061-2.

[14] T. Tran, F. Lan, C. Thompson, A. Abate, From tubes to drops: droplet-based microfluidics for ultrahigh-throughput biology, Journal of Physics D: Applied Physics, 46(2013) 114004.

[15] E. S. Hamilton, A. R. Hawkins, Direct macro-to-micro interface method for microfluidics, Journal of Micromechanics and Microengineering, 30(2020) 057001.

[16] T. D. Rane, H. C. Zec, T. H. Wang, A serial sample loading system: interfacing multiwell plates with microfluidic devices, J Lab Autom, 17(2012) 370-7.

[17] R. Menezes, A. Dramé-Maigné, V. Taly, Y. Rondelez, G. Gines, Streamlined digital bioassays with a 3D printed sample changer, Analyst, 145(2020) 572-81.

[18] O. J. Miller, A. El Harrak, T. Mangeat, J.-C. Baret, L. Frenz, B. El Debs, et al., High-resolution dose—response screening using droplet-based microfluidics, Proceedings of the National Academy of Sciences, 109(2012) 378-83.

[19] U. Tangen, G. A. S. Minero, A. Sharma, P. F. Wagler, R. Cohen, O. Raz, et al., DNA-library assembly programmed by on-demand nano-liter droplets from a custom microfluidic chip, Biomicrofluidics, 9(2015) 044103.

[20] T. S. Kaminski, S. Jakiela, M. A. Czekalska, W. Postek, P. Garstecki, Automated generation of libraries of nL droplets, Lab on a Chip, 12(2012) 3995-4002.

[21] J. Clausell-Tormos, A. D. Griffiths, C. A. Merten, An automated two-phase microfluidic system for kinetic analyses and the screening of compound libraries, Lab on a Chip, 10(2010) 1302-7.

[22] D. L. Chen, R. F. Ismagilov, Microfluidic cartridges preloaded with nanoliter plugs of reagents: an alternative to 96-well plates for screening, Current opinion in chemical biology, 10(2006) 226-31.

[23] M. Chabert, K. D. Dorfman, P. De Cremoux, J. Roeraade, J.-L. Viovy, Automated microdroplet platform for sample manipulation and polymerase chain reaction, Analytical Chemistry, 78(2006) 7722-8.

[24] Y. Sun, X. Zhou, Y. Yu, A novel picoliter droplet array for parallel real-time polymerase chain reaction based on double-inkjet printing, Lab Chip, 14(2014) 3603-10.

[25] V. Studer, G. Hang, A. Pandolfi, M. Ortiz, W. French Anderson, S. R. Quake, Scaling properties of a low-actuation pressure microfluidic valve, Journal of applied physics, 95(2004) 393-8.

[26] H. C. Zec, T. Zheng, L. Liu, K. Hsieh, T. D. Rane, T. Pederson, et al., Programmable microfluidic genotyping of plant DNA samples for marker-assisted selection, Microsystems & Nanoengineering, 4(2018) 1-10.

[27] T. D. Rane, H. C. Zec, T. H. Wang, A barcode-free combinatorial screening platform for matrix metalloproteinase screening, Anal Chem, 87(2015) 1950-6.

[28] H. Zec, T. D. Rane, T.-H. Wang, Microfluidic platform for on-demand generation of spatially indexed combinatorial droplets, Lab on a Chip, 12(2012) 3055-62.

[29] G. Gome, J. Waksberg, A. Grishko, I. Y. Wald, O. Zuckerman, OpenLH: Open Liquid-Handling System for Creative Experimentation with Biology, Proceedings of the Thirteenth International Conference on Tangible, Embedded, and Embodied Interaction, Association for Computing Machinery, Tempe, Arizona, USA, 2019, pp. 55-64.

[30] S. Steffens, L. NiiBer, T.-B. Seiler, N. Ruchter, M. Schumann, R. Doring, et al., A versatile and low-cost open source pipetting robot for automation of toxicological and ecotoxicological bioassays, PLoS One, 12(2017) e0179636.

[31] P. Zhu, L. Wang, Passive and active droplet generation with microfluidics: a review, Lab on a Chip, 17(2017) 34-75.

[32] P. Zhang, A. Kaushik, K. Hsieh, T. H. Wang, Customizing droplet contents and dynamic ranges via integrated programmable picodroplet assembler, Microsyst Nanoeng, 5(2019) 22.

[33] O. V. Trubetskoy, J. R. Gibson, B. D. Marks, Highly miniaturized formats for in vitro drug metabolism assays using Vivid® fluorescent substrates and recombinant human cytochrome P450 enzymes, Journal of biomolecular screening, 10(2005) 56-66.

[34] M. Vaithiyanathan, K. R. Bajgiran, P. Darapaneni, N. Safa, J. A. Dorman, A. T. Melvin, Luminescent nanomaterials for droplet tracking in a microfluidic trapping array, Analytical and bioanalytical chemistry, 411(2019) 157-70.

[35] H. Li, T. Garner, F. Diaz, P. K. Wong, A Multiwell Microfluidic Device for Analyzing and Screening Non-hormonal Contraceptive Agents, Small, 15(2019) e1901910.

[36] R. M. Imamura, K. Kumagai, H. Nakano, T. Okabe, T. Nagano, H. Kojima, Inexpensive High-Throughput Screening of Kinase Inhibitors Using One-Step Enzyme-Coupled Fluorescence Assay for ADP Detection, SLAS DISCOVERY: Advancing Life Sciences R&D, 24(2019) 284-94.

[37] J. Hashimoto, T. Watanabe, T. Seki, S. Karasawa, M. Izumikawa, T. Seki, et al., Novel in vitro protein fragment complementation assay applicable to high-throughput screening in a 1536-well format, Journal of biomolecular screening, 14(2009) 970-9.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A sample-to-droplet microfluidic system, comprising:
a sample-to-droplet microfluidic chip;
a valve control system connected to said sample-to-droplet microfluidic chip;
a vacuum system fluidly connected to said sample-to-droplet microfluidic chip; and
a droplet formation pressure system fluidly connected to said sample-to-droplet microfluidic chip,
wherein said sample-to-droplet microfluidic chip comprises:
a sample-to-droplet interface section;

a droplet mixing section in fluid connection with said sample-to-droplet interface section to received droplets therefrom;

an incubation section in fluid connection with said droplet mixing section to receive droplets therefrom; and a detection section in fluid connection with said incubation section to receive droplets therefrom;

wherein said sample-to-droplet interface section comprises:

a first sample input channel with a first open port configured to receive a sample input, a vacuum channel fluidly connected to said first sample input channel when a pair of intermediate valves therein are open, a first droplet forming region being between said pair of intermediate valves, a first fluid pressure channel arranged to intercept said first droplet forming region with a valve prior to said first droplet forming region, said first fluid pressure channel further intercepting a droplet channel with a valve therebetween, said droplet channel leading to said droplet mixing section, wherein said sample-to-droplet interface section further comprises:

a second sample input channel with an open port configured to receive a sample input, said vacuum channel being further fluidly connected to said second sample input channel when a pair of intermediate valves therein are open, a second droplet forming region being between said pair of intermediate valves, and a second fluid pressure channel arranged to intercept said second droplet forming region with a valve prior to said droplet forming region, said second fluid pressure channel further intercepting said droplet channel with a valve therebetween.

2. The microfluidic system according to claim 1, further comprising a robotic system configured to acquire a selected amount of a sample and to deliver said selected amount of said sample to said open port of said first sample channel.

3. The microfluidic system according to claim 2, wherein said robotic system is further configured to deliver said selected amount of said sample to said open port of said second sample channel.

4. The microfluidic system according to claim 1, wherein said microfluidic chip comprises a fluid flow layer and a control layer constructed such that said first sample input channel, said vacuum channel, and said first fluid pressure channel are defined within said fluid flow layer.

5. The microfluidic chip according to claim 4, wherein said second sample input channel, and said second fluid pressure channel are defined within said fluid flow layer.

6. The microfluidic chip according to claim 4, wherein valve control channels are defined within said control layer, said valve control channels being suitable for carrying fluid for pneumatic control of said valves.

7. A microfluidic chip for a sample-to-droplet microfluidic system, comprising:

a sample-to-droplet interface section;

a droplet mixing section in fluid connection with said sample-to-droplet interface section to received droplets therefrom;

an incubation section in fluid connection with said droplet mixing section to receive droplets therefrom; and a detection section in fluid connection with said incubation section to receive droplets therefrom;

wherein said sample-to-droplet interface section comprises:

a first sample input channel with an open port configured to receive a sample input, a vacuum channel fluidly connected to said first sample input channel when a pair of intermediate valves therein are open, a first droplet forming region being between said pair of intermediate valves, a first fluid pressure channel arranged to intercept said first droplet forming region with a valve prior to said droplet forming region, said first fluid pressure channel further intercepting a droplet channel with a valve therebetween, said droplet channel leading to said droplet mixing section, and wherein said sample-to-droplet interface section further comprises:

a second sample input channel with an open port configured to receive a sample input, said vacuum channel being further fluidly connected to said second sample input channel when a pair of intermediate valves therein are open, a second droplet forming region being between said pair of intermediate valves, and a second fluid pressure channel arranged to intercept said second droplet forming region with a valve prior to said droplet forming region, said second fluid pressure channel further intercepting said droplet channel with a valve therebetween.

8. The microfluidic chip according to claim 7, wherein said microfluidic chip comprises a fluid flow layer and a control layer constructed such that said first sample input channel, said vacuum channel, and said first fluid pressure channel are defined within said fluid flow layer.

9. The microfluidic chip according to claim 8, wherein said second sample input channel, and said second fluid pressure channel are defined within said fluid flow layer.

10. The microfluidic chip according to claim 9, wherein valve control channels are defined within said control layer, said valve control channels being suitable for carrying fluid for pneumatic control of said valves.

* * * * *